(12) United States Patent
Jann et al.

(10) Patent No.: US 10,346,184 B2
(45) Date of Patent: Jul. 9, 2019

(54) OPEN DATA PROTOCOL SERVICES IN APPLICATIONS AND INTERFACES ACROSS MULTIPLE PLATFORMS

(71) Applicant: SAP SE, Walldorf (DE)

(72) Inventors: Florian Jann, Heidelberg (DE); Annette Jann, Heidelberg (DE); Emil Voutta, Heidelberg (DE); Kai Richter, Muehltal (DE); Ioannis Grammatikakis, Maxdorf (DE); Maria Cabahug, Palo, CA (US)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/461,290

(22) Filed: Mar. 16, 2017

(65) Prior Publication Data

US 2017/0329581 A1 Nov. 16, 2017

Related U.S. Application Data

(60) Provisional application No. 62/335,897, filed on May 13, 2016, provisional application No. 62/335,899, (Continued)

(51) Int. Cl.
*G06F 8/38* (2018.01)
*G06F 9/451* (2018.01)
(Continued)

(52) U.S. Cl.
CPC .............. *G06F 9/451* (2018.02); *G06F 8/38* (2013.01); *G06F 9/4451* (2013.01); *G06F 9/541* (2013.01);
(Continued)

(58) Field of Classification Search
None
See application file for complete search history.

(56) References Cited

U.S. PATENT DOCUMENTS 5,517,663 A 5/1996 Kahn
5,657,462 A 8/1997 Brouwer
(Continued)

OTHER PUBLICATIONS

"SAP Blog Part 1", Ferriero, S. (May 6, 2016), How to create smart Templates annotations within CDS views—Part 1. [Retrieved Oct. 8, 2018] https://blogs.sap.com/2016/05/09/how-to-create-smart-templates-annotations-within-cds-views-part-1 (17 pages).
(Continued)

*Primary Examiner* — Philip Wang
(74) *Attorney, Agent, or Firm* — Fish & Richardson P.C.

(57) ABSTRACT

In one general aspect, a system and method are described for generating user interfaces at runtime. The system may include memory and processors to implement a gateway to receive a plurality of service requests, a first component to translate the plurality of service requests into structured query language statements and execute the structured query language statements, a second component to access a plurality of stored document models based on the executed structured query language statements, a service component to aggregate data based upon one or more of the document models and at least one service request, and a user interface generator to generate and provide a plurality of user interfaces configured to present the aggregated data.

20 Claims, 17 Drawing Sheets

Related U.S. Application Data filed on May 13, 2016, provisional application No. 62/335,895, filed on May 13, 2016, provisional application No. 62/335,879, filed on May 13, 2016, provisional application No. 62/335,886, filed on May 13, 2016, provisional application No. 62/335,883, filed on May 13, 2016, provisional application No. 62/335,892, filed on May 13, 2016, provisional application No. 62/335,887, filed on May 13, 2016.

(51) Int. Cl.
  *G06Q 10/10* (2012.01)
  *G06F 9/54* (2006.01)
  *G06F 9/445* (2018.01)

(52) U.S. Cl.
  CPC ............ *G06F 9/547* (2013.01); *G06Q 10/10* (2013.01); *G06F 2209/541* (2013.01)

(56) References Cited

U.S. PATENT DOCUMENTS

| | | | |
|---|---|---|---|
| 5,682,469 A | 10/1997 | Linnett | |
| 5,727,950 A | 3/1998 | Cook | |
| 5,754,174 A | 5/1998 | Carpenter | |
| 5,877,759 A | 3/1999 | Bauer | |
| 6,025,841 A | 2/2000 | Finkelstein | |
| 6,085,184 A | 7/2000 | Bertrand | |
| 6,262,730 B1 | 7/2001 | Horvitz | |
| 6,735,632 B1 | 5/2004 | Kiraly | |
| 6,751,606 B1 | 6/2004 | Fries | |
| 6,788,313 B1 | 9/2004 | Heil | |
| 6,845,486 B2 | 1/2005 | Yamada | |
| 6,892,349 B2 | 5/2005 | Shizuka | |
| 7,441,190 B2 | 10/2008 | Asami | |
| 7,603,375 B2 | 10/2009 | Ng | |
| 7,636,045 B2 | 12/2009 | Sugiyama | |
| 7,797,146 B2 | 9/2010 | Harless | |
| 7,797,338 B2 | 9/2010 | Feng | |
| 7,933,399 B2 | 4/2011 | Knott | |
| 7,966,269 B2 | 6/2011 | Bauer | |
| 8,225,231 B2 | 7/2012 | Zielinski | |
| 8,978,010 B1 | 3/2015 | Thumfart et al. | |
| 9,176,801 B2 | 11/2015 | Baeuerle et al. | |
| 9,202,171 B2 | 12/2015 | Kuhn | |
| 9,223,549 B1 | 12/2015 | Hermanns et al. | |
| 9,703,458 B2 * | 7/2017 | Sasaki | G06F 3/0484 |
| 9,740,462 B2 | 8/2017 | Rao et al. | |
| 9,807,145 B2 | 10/2017 | Koon | |
| 2002/0005865 A1 | 1/2002 | Hayes-Roth | |
| 2002/0149611 A1 | 10/2002 | May | |
| 2003/0020671 A1 | 1/2003 | Santoro | |
| 2003/0028498 A1 | 2/2003 | Hayes-Roth | |
| 2004/0056878 A1 | 3/2004 | Lau | |
| 2004/0075677 A1 | 4/2004 | Loyall | |
| 2004/0179659 A1 | 9/2004 | Byrne | |
| 2005/0039127 A1 | 2/2005 | Davis | |
| 2006/0041848 A1 | 2/2006 | Lira | |
| 2006/0136223 A1 | 6/2006 | Brun | |
| 2006/0253791 A1 | 11/2006 | Kuiken | |
| 2006/0271398 A1 | 11/2006 | Belcastro | |
| 2007/0083821 A1 | 4/2007 | Galbow | |
| 2007/0226241 A1 | 9/2007 | Ng | |
| 2008/0096533 A1 | 4/2008 | Manfredi | |
| 2008/0155409 A1 | 6/2008 | Santana | |
| 2009/0153335 A1 | 6/2009 | Birtcher | |
| 2009/0248695 A1 | 10/2009 | Ozzie | |
| 2010/0199195 A1 | 8/2010 | Carounanidy | |
| 2011/0283215 A1 | 11/2011 | Dunn | |
| 2012/0216125 A1 | 8/2012 | Pierce | |
| 2012/0253788 A1 | 10/2012 | Heck | |
| 2012/0254227 A1 | 10/2012 | Heck | |
| 2012/0265528 A1 | 10/2012 | Gruber | |
| 2013/0152017 A1 | 6/2013 | Song | |
| 2013/0174034 A1 | 7/2013 | Brown | |
| 2013/0204813 A1 | 8/2013 | Master | |
| 2014/0040748 A1 | 2/2014 | Lemay | |
| 2014/0068459 A1 | 3/2014 | Graham | |
| 2014/0074483 A1 | 3/2014 | Van Os | |
| 2014/0337770 A1 * | 11/2014 | Sasaki | G06F 3/0484 |
| | | | 715/762 |
| 2014/0344024 A1 | 11/2014 | Kempf | |
| 2015/0006135 A1 | 1/2015 | Deb et al. | |
| 2015/0040104 A1 | 2/2015 | Mall | |
| 2015/0074069 A1 | 3/2015 | Baeuerle et al. | |
| 2015/0089373 A1 | 3/2015 | Dwivedi et al. | |
| 2015/0089403 A1 | 3/2015 | Zhu et al. | |
| 2015/0123993 A1 | 5/2015 | Ohba | |
| 2015/0161180 A1 | 6/2015 | Hermanns et al. | |
| 2015/0186156 A1 | 7/2015 | Brown | |
| 2015/0195406 A1 | 7/2015 | Dwyer | |
| 2015/0339036 A1 | 11/2015 | Hwang | |
| 2015/0382047 A1 | 12/2015 | Van Os | |
| 2016/0062745 A1 | 3/2016 | Rao | |
| 2016/0070580 A1 | 3/2016 | Johnson | |
| 2016/0094497 A1 | 3/2016 | Javed | |
| 2016/0378326 A1 | 12/2016 | Svinth | |
| 2017/0177650 A1 * | 6/2017 | Devine | G06F 17/30371 |
| 2017/0329466 A1 | 11/2017 | Krenkler et al. | |
| 2017/0329468 A1 * | 11/2017 | Schon | G06F 3/0482 |
| 2017/0329479 A1 | 11/2017 | Rauschenbach et al. | |
| 2017/0329483 A1 * | 11/2017 | Jann | G06F 3/0485 |
| 2017/0329499 A1 * | 11/2017 | Rauschenbach | G06F 3/04845 |
| 2017/0329500 A1 | 11/2017 | Grammaikakis et al. | |
| 2017/0329505 A1 | 11/2017 | Richter et al. | |
| 2017/0329580 A1 | 11/2017 | Jann et al. | |
| 2017/0329614 A1 | 11/2017 | Schon et al. | |
| 2017/0331915 A1 | 11/2017 | Jann et al. | |
| 2017/0344218 A1 | 11/2017 | Jann et al. | |
| 2017/0346949 A1 | 11/2017 | Sanghavi | |

OTHER PUBLICATIONS

"SAP Blog Part 2", Ferriero, S. (May 9, 2016), How to create smart Templates annotations within CDS views—Part 2. [Retrieved Oct. 8, 2018] https://blogs.sap.com/2016/05/09/how-to-create-smart-templates-annotations-within-cds-views-part-2 (15 pages).

U.S. Non-Final Office Action in U.S. Appl. No. 15/462,072, dated Jan. 9, 2019, 15 pages.

"SAP Blog Part 3", Ferriero, S. (May 9, 2016), How to create smart Templates annotations within CDS views—Part 3. [Retrieved Mar. 27, 2018] https://blogs.sap.com/2016/05/09/how-to-create-smart-templates-annotations-within-cds-views-part-3 (22 pages).

EP Extended European Search Report for European Appln. No. 17000813.0, dated Aug. 23, 2017, 7 pages.

U.S. Non-Final Office Action in U.S. Appl. No. 15/390,262, dated Nov. 30, 2018, 18 pages.

U.S. Non-Final Office Action in U.S. Appl. No. 15/461,313, dated Apr. 5, 2018, 10 pages.

U.S. Non-Final Office Action in U.S. Appl. No. 15/461,330, dated Aug. 10, 2018, 14 pages.

U.S. Non-Final Office Action in U.S. Appl. No. 15/461,296, dated Dec. 11, 2018, 26 pages.

U.S. Non-Final Office Action in U.S. Appl. No. 15/591,989, dated Nov. 14, 2018, 15 pages.

U.S. Non-Final Office Action in U.S. Appl. No. 15/462,084, dated Nov. 21, 2018, 15 pages.

* cited by examiner

OPEN DATA PROTOCOL SERVICES IN APPLICATIONS AND INTERFACES ACROSS MULTIPLE PLATFORMS

CROSS REFERENCE TO RELATED APPLICATIONS

This application claims priority to and the benefit of U.S. Provisional Application No. 62/335,892, filed May 13, 2016, U.S. Provisional Application No. 62/335,895, filed May 13, 2016, U.S. Provisional Application No. 62/335,897, filed May 13, 2016, U.S. Provisional Application No. 62/335,899, filed May 13, 2016, U.S. Provisional Application No. 62/335,879, filed May 13, 2016, U.S. Provisional Application No. 62/335,883, filed May 13, 2016, U.S. Provisional Application No. 62/335,886, filed May 13, 2016 and U.S. Provisional Application No. 62/335,887, filed May 13, 2016, each of which is incorporated by reference in its entirety.

TECHNICAL FIELD

This description generally relates to user interfaces. The description, in particular, relates to systems and techniques for providing a user interface experience for viewing data and information related to multiple software applications.

BACKGROUND

A user of software applications designed to support processes used by an enterprise often needs to navigate back and forth between multiple (and in many cases different) user interfaces and application instances in order to carry out transactional tasks when making a viable decision for the enterprise. In many cases, the navigation can include viewing data and information related to multiple applications. While navigating between the various user interfaces and application instances, the user may become lost and confused, losing a context of a current transactional task. This can create major usability issues, resulting in the inability of the user to effectively carryout the transactional tasks. In general, the user has a poor user experience using and interacting with the software applications.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system for generating user interfaces at runtime. The system may include at least one memory including instructions on a computing device and at least one processor on the computing device, where the processor is operably coupled to the at least one memory and is arranged and configured to execute the instructions that, when executed, cause the processor to implement the following features. The processor can implement a gateway to receive a plurality of service requests, a first component to translate the plurality of service requests into structured query language statements and execute the structured query language statements, a second component to access a plurality of stored document models based on the executed structured query language statements, a service component to aggregate data based upon one or more of the document models and at least one service request, and a user interface generator to generate and provide a plurality of user interfaces configured to present the aggregated data. Other embodiments of this aspect include corresponding computer systems, apparatus, and computer programs recorded on one or more computer storage devices, each configured to perform the actions of the methods.

Implementations may include one or more of the following features. The system where functionality of the at least one service is generated automatically for provision in the plurality of user interfaces. The system where the execution of the structured query language statements is based at least in part on the plurality of predefined document models. The system where the gateway represents an access layer between a client device and at least one user interface in the plurality of user interfaces. The system where the gateway enables the development of additional user interfaces based upon the document models. The system where the gateway employs representational state transfer (RESTful) application programming interfaces (APIs) to provide the plurality of user interfaces. The system where the plurality of services are open protocol data services that access the data models and corresponding metadata to provide a proxy to access at least one of the plurality of user interfaces. The system where the open protocol data services define a communication protocol for accessing the at least one user interface. The system where the gateway supports a plurality of different versions for the at least one service. Implementations of the described techniques may include hardware, a method or process, or computer software on a computer-accessible medium.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1A:
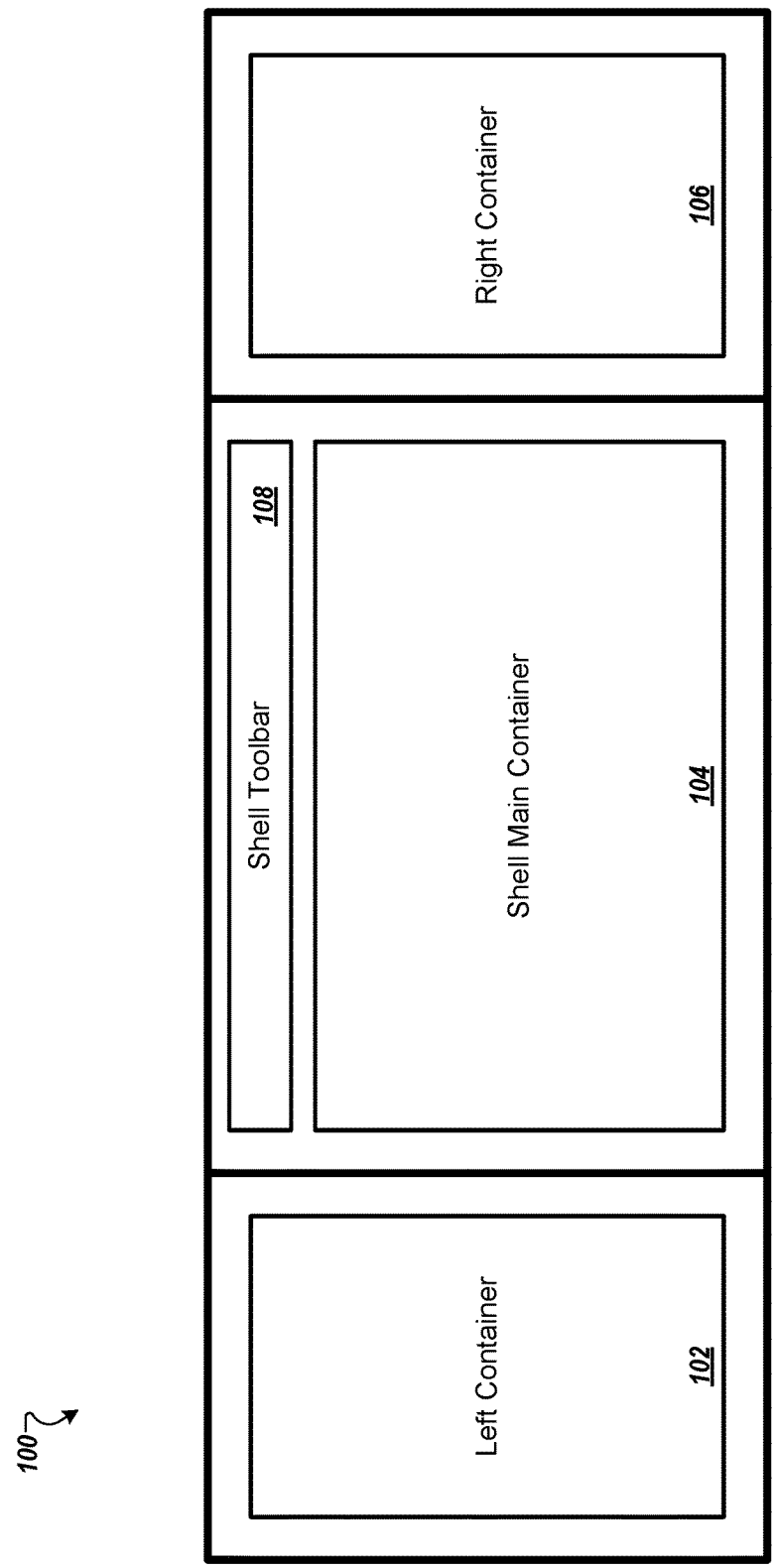
FIG. 1A is an illustration of a user interface entry point (a viewport) for a particular user experience.

Analytical applications and transactional applications may be used to provide role-based, real time information about operations carried out by enterprise transactional applications. To facilitate such applications, the architecture described in this disclosure can enable developers and end users to utilize Open Data Protocol (OData) services and techniques. Such services can employ a gateway to provide a way to connect devices, environments, and platforms to enterprise software based on market standards. The gateway may represent an architecture layer between a client (e.g., device, framework, etc.) and the provided applications described herein. The gateway can enable the development of UIs for use in different environments (e.g., social and collaboration environments). The gateway can also enable the development of UIs for use on different types of client computing devices.

In one example, the gateway can be operated using Representational State Transfer (RESTful) application programming interfaces (APIs) to implement access to any number of applications hosted on the architecture described herein via OData services). The OData services can be used to employ metadata and data models to provide genericized proxies and tools for the developer to develop and for the end user to consume. In addition, the OData services can be used to determine changes in an application and to define functions for reuse of componentry. In general, OData services provide an application-level data access protocol using HTTP as the data transfer protocol.

In some implementations, the architecture described herein can employ OData services to execute applications in a scalable and cost-efficient manner in a cloud computing environment by following protocols defined in the OData services. In general, the architecture described herein may employ SAP.UI5 with OData services to build user interfaces (UIs) for a simplified user experience (UX) across digital assets defined in applications and interfaces across multiple platforms (e.g., UI technologies such as HTML5/SAP.UI5, WebDynPro, WebGUI, and SAPGUI, etc.).

In operation, OData services may define a common access layer for consuming application data. In general, an OData service can be defined by a lifecycle of the service and can include activation of the OData service, maintenance of the OData service, maintenance of models and services (up to and including clean up of the metadata cache) associated with the OData service, employing RESTful applications to use HTTP requests to post, create, update, read, and/or delete data, and to employ REST techniques for web services to use HTTP for create, read, update, and/or delete operations, as described in more detail below.

Enterprise transactional applications can evolve from large monolithic on-premise software deployments into multiple (e.g., hundreds of, thousands of) small, componentized applications that can execute (run) on various types of computing devices and network platforms. For example, the fifth version of Hypertext Markup Language (HTML5) can be used as a basis for structuring and presenting an application platform that includes a grid matrix-style home screen or dashboard-like user interface. The use of HTML5 can provide an improved user experience, can reduce a user interface complexity, and may increase user productivity across multiple types of computing devices. The computing devices can include, but are not limited to, desktop computers and mobile computing devices such as laptop computers, tablet computers, notebook computers, personal digital assistants (PDAs), smartphones, mobile phones, smart watches, etc.).

In some cases, the grid matrix-style home screen or dashboard-like user interface allows a user to open and access a selected application. In some cases, the grid matrix-style home screen or dashboard-like user interface allows a user to access content within an application. These user interfaces can present user experience (UX) and user interface (UI) shortcomings while attempting to provide optimized usability and user-centric business functionalities related to transactional tasks.

For example, users may need to navigate back and forth between multiple screens that can include home screens, application instances, and drill downs, in order to perform various transactional tasks to make viable business decisions. The user may need to navigate back and forth between multiple screens when viewing related data between various applications.

For example, applications and application instances may not interoperate with each other. Because of this, user navigation and operations may not be minimized. Applications may not readily access relative content without first needing to open an application instance and then perform numerous navigations.

In order to improve a user experience (UX), a user interface can be implemented to intuitively propose relative context or intent to a user. A user interface can be implemented to conform to, recognize, and facilitate ways in which a user may personally work. A user interface can be implemented to help a user remember important tasks. The use of such a "smart" user interface can help a user easily manage and keep track of the context of current tasks and activities when carrying out transactional tasks.

A shortcoming of a UX and a UI can be a lack of relative business contexts related to user roles and expertise that can empower employees to do their job better, faster, and in a more deliberate way. Providing a user with a way to personalize an experience of the user based on a role requirement of the user can result in a better overall user experience. For example, the personalization can result in a UI automatically providing proposals for transactional tasks that the user may need to see. The proposals can be provided at a time when the user wants to see the proposal and on a computing device chosen by the user. The proposals can be provided to the user as a result of a single click or gesture input to the user interface by the user. The UI can be considered a central interface that can provide a user with the ability to communicate, collaborate, initiate, and/or respond to colleagues, managers, and customers without leaving the context of their current activity or application.

Alternatively, a user may have to navigate through multiple applications and user interfaces. A user may easily lose a context of a current task or activity while having to navigate through user interfaces provided in a multiple application environment for an enterprise. The loss of context can affect the ability of the user to effectively carryout a transactional task. In addition, navigating through user interfaces provided in a multiple application environment may not allow a user to readily view, at a glance, live data that may be relevant to personal and professional daily activities, responsibilities, and organizational accountabilities of the user. The user may not be provided with a way to efficiently manage hundreds (or thousands) of applications associated with transactional workflows in the enterprise.

Enterprise applications that are associated with transactional workflows in an enterprise can be implemented using a software development technology or foundation (e.g., HTML5/CSS/JS technology) in a particular UI framework (e.g., SAPUI5) in order to provide a beneficial UX and UI. The enterprise applications can be implemented to execute or run on multiple different types of computing devices such as desktop computers and mobile computing devices (e.g., laptop computers, tablet computers, notebook computers, personal digital assistants (PDAs), smartphones, mobile phones, smart watches, etc.).

For example, the UI may use elements of a particular UX (e.g., an SAP Fiori® UX) to provide a user with a personalized, responsive, seamless, and simple user experience across enterprise applications (including legacy and new), across different types of computing devices such as desktop computers and mobile computing devices (e.g., laptop computers, tablet computers, notebook computers, personal digital assistants (PDAs), smartphones, mobile phones, smart watches, etc.), and across all possible deployment options (e.g., on-premise, cloud, as-a-service, etc.).

The particular UX can deploy an array of interactive features and process tools that can be integrated with a suite or set of enterprise applications that have specific functionalities. The particular UX can provide intelligent, contextual-based support for users across an enterprise. The particular UX can use a "push" model that can anticipate tasks (e.g., transactional tasks) for a user based on a role of the user in the enterprise. The particular UX can import real-time data that can be tailored to specific tasks. The software for the UI for the particular UX can be implemented to easily and transparently scale the UI accordingly for display on each display device included in each of the different possible computing devices that can execute (run) the enterprise applications.

FIG. 1A is an illustration of a UI entry point (a viewport 100) for a particular UX. The viewport 100 can be a single-screen view partitioned into multiple (e.g., three) multifunctional screen areas (e.g., a left screen area (left container 102, a center screen area (shell main container 104), and a right screen area (right container 106) for display in a display area (on a display device) included in a computing device. The viewport 100 can include a shell toolbar 108. The shell toolbar 108 can include a global search and other services, which are available to a user across all enterprise applications.

The shell main container 104 can display information for use as a main workspace for the UX. In some implementations, multiple different screens can be displayed in the shell main container 104. For example, a login screen, a launchpad screen, and an overview page can alternatively be displayed in the shell main container 104. The viewport 100 can provide a user with a screen orientation that can allow the user access to application information. The viewport 100 can provide the user with a UX and UI that includes the business functionalities and enterprise application-to-application navigations needed by the user without disrupting a context of a current task of the user.

Figure 1B:
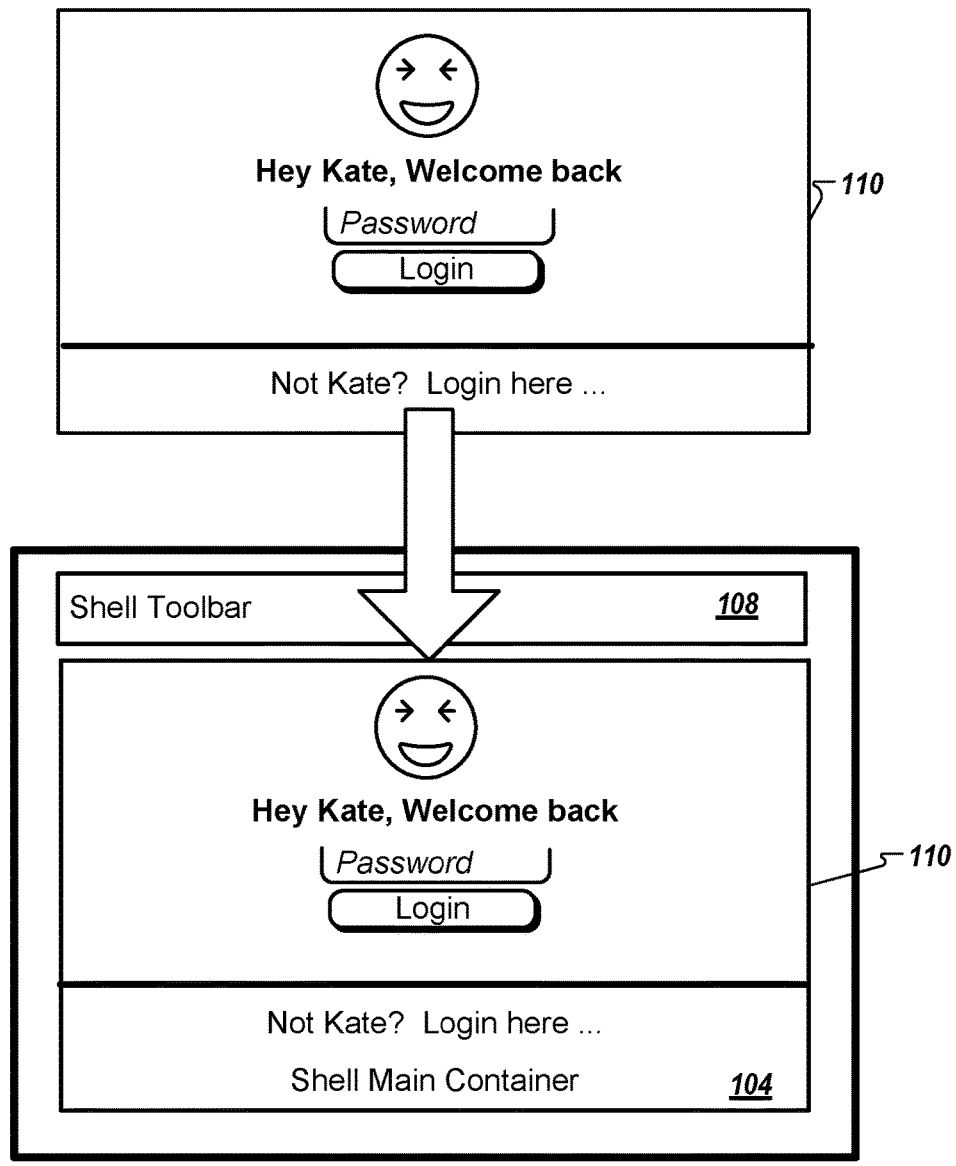
FIG. 1B is an illustration showing an example login screen displayed in a shell main container.

FIG. 1B is an illustration showing an example login screen 110 displayed in the shell main container 104. The login screen 110 provides a UI that allows a user to enter credentials in order to log into and begin a personalized and customized UX. In the example shown in FIG. 1B, the login screen 110 appears to drop into the shell main container 104 from a virtual extension area located along a top of a display area. In some implementations, the virtual extension area can be placed along the bottom of the display area. In some implementations, the virtual extension area can be placed to the left and/or the right of the display area.

Figure 1C:
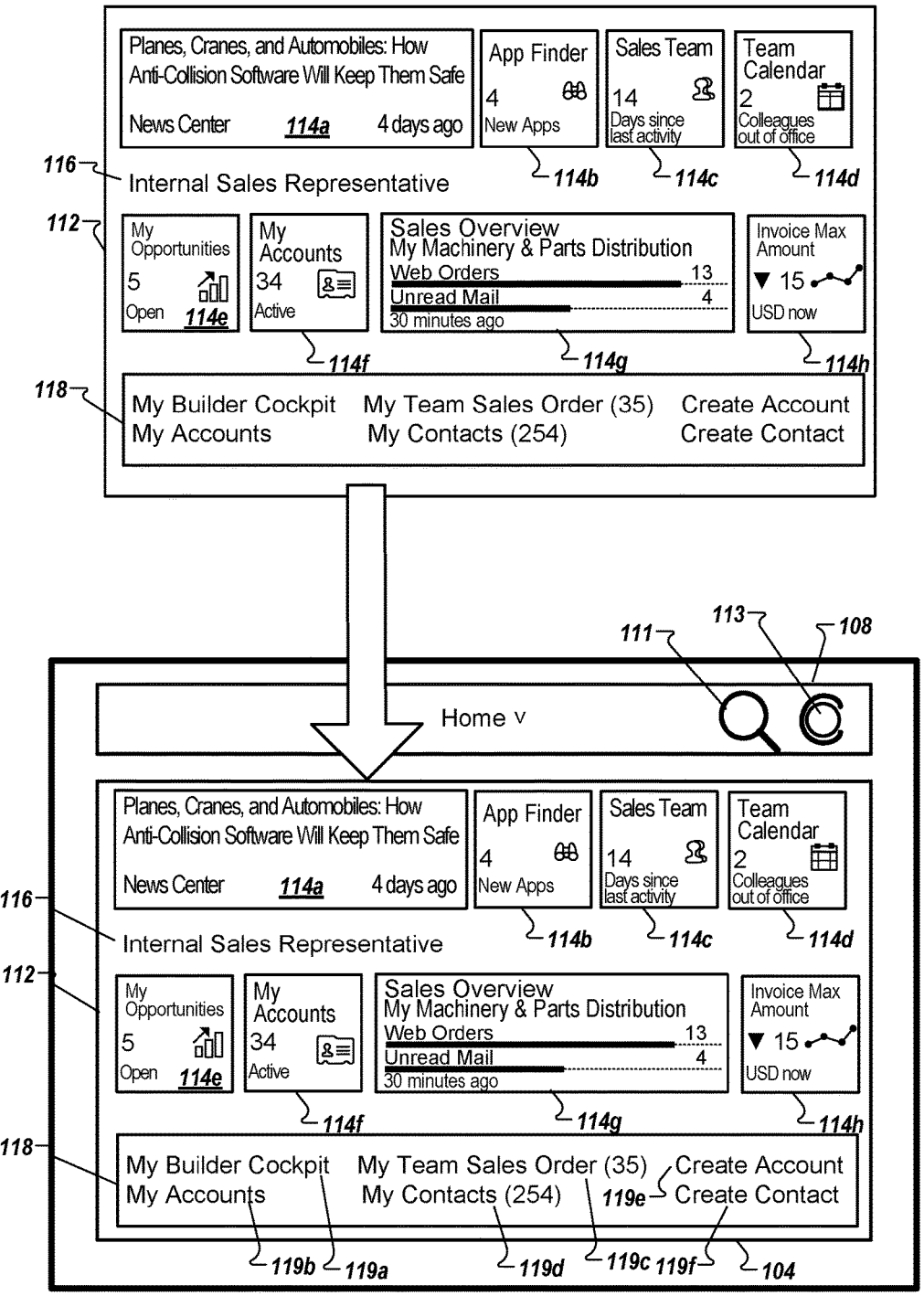
FIG. 1C is an illustration showing an example launchpad displayed in a shell main container.

FIG. 1C is an illustration showing an example launchpad 112 displayed in the shell main container 104. The launchpad 112 can be a web-based entry point (or homepage) for enterprise applications that can execute (run) across multiple platforms and computing devices. In the example shown in FIG. 1C, the launchpad 112 appears to drop into the shell main container 104 from the top of a display area. In some implementations, the virtual extension area can be placed along the bottom of the display area. In some implementations, the virtual extension area can be placed to the left and/or the right of the display area.

The launchpad 112 can serve as a bracket around (or a base for) a set (or group) of enterprise applications, providing a single point of entry for the set of enterprise applications. In the example shown in FIG. 1C, the launchpad 112 presents (displays on a screen of a computing device of a user) each application represented by a tile. A tile can be a container that represents the application. Each tile can display different types of content. A user can interact with each tile to navigate to the specific enterprise application associated with the tile. In addition, when designing a tile to represent a specific application, a programmer can assign a tile to a specific user or group of users. The launchpad 112 can provide one or more services. The one or more services can include, but are not limited to, application-to-application navigation, personalization, role-based application assignments, search, and incident creation.

The launchpad 112 can be a role based, personalized, real-time and contextual aggregation point for business applications and analytics. The launchpad 112 can run (execute) on multiple computing devices including, but not limited to, desktop computers and mobile computing devices such as laptop computers, tablet computers, notebook computers, personal digital assistants (PDAs), smartphones, mobile phones, smart watches, etc.). In addition, the launchpad 112 can be deployed on multiple platforms (e.g., Linux, Windows, Windows Phone, MAC®, iOS®, OS X®, Android®, etc.).

The launchpad 112 includes tiles 114*a-h*. Each tile can display different types of content. For example, tile 114*a* can be a news and feeds tile that can enhance collaboration by providing a user with information about the enterprise. The tiles 114*a-h* can be individually color-coded. A color can represent a particular role (e.g., finance, human resources, supply chain management (SCM), customer relationship management (CRM), etc.). The tiles 114*a-h* can be associated with a group 116. Tile 114*f* can be a key performance indicator (KPI) tile. Tile 114*b* can be a basic launch tile. Tile 114*d* can be a monitoring tile. Tile 114*g* can display a comparison chart for specific content.

The launchpad 112 includes a link list area 118 that includes links 119*a-f*. The link list area 118 is an area on the launchpad 112 that can provide links to enterprise applications represented by the tiles 114*a-h*. For example, a user can select and drag a tile from the tile area on the launchpad 112 into the link list area 118 to create a link to the application associated with (represented by) the tile. In some implementations, the launchpad 112 can include a footer toolbar (e.g., footer toolbar 132 as shown in FIG. 1F). In some implementations, the footer toolbar can appear to float over the content displayed in the launchpad 112.

In some implementations, the shell toolbar 108 can display a search icon 111 and a copilot launch icon 113. A user can select (click on) the copilot launch icon 113 to launch a copilot UI. A copilot UI will be described in more detail with reference to FIG. 1I.

Figure 1D:
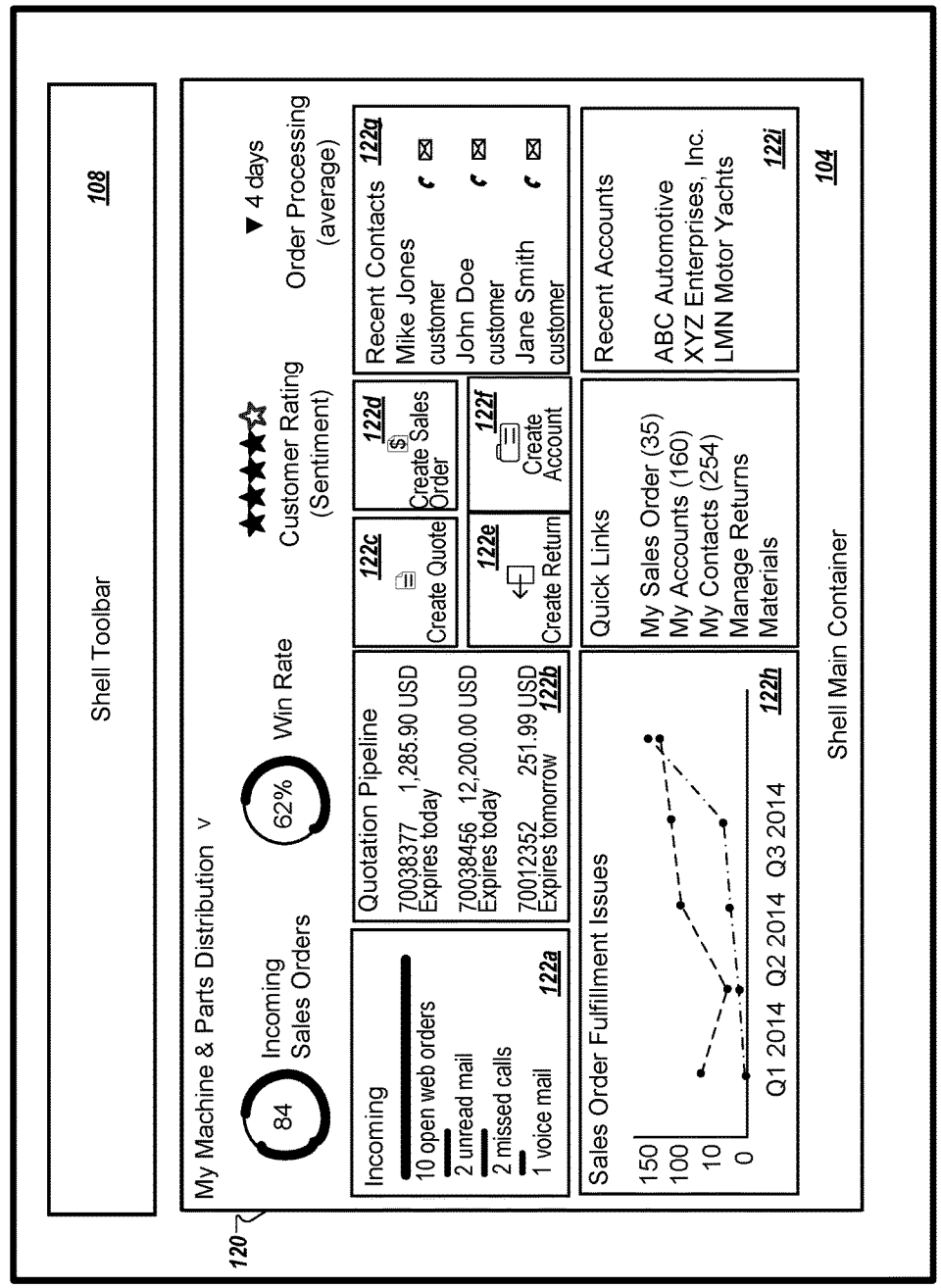
FIG. 1D is an illustration showing an example active application screen (an overview page) displayed in a shell main container.

FIG. 1D is an illustration showing an example active application screen (overview page 120) displayed in the shell main container 104. The enterprise applications that can be accessed by a user by way of the launchpad 112 and then subsequently displayed in an active application screen (e.g., the overview page 120) can include, but are not limited to, transactional applications, analytical applications, and fact sheet applications (contextual navigation applications). Transactional applications can allow a user to create, change and/or approve processes with guided navigation. Analytical applications can provide a user with a visual overview of a dedicated topic for monitoring and tracking purposes to allow for further key performance indicator (KPI) related analysis. Fact sheet applications can allow a user to view essential information about an object and to allow navigation between related objects.

The overview page 120 can visualize all of the information a user may need for a specific business context (business domain) on a single page or screen. The information can be displayed in one or more variable content packages (VCPs) or cards 122*a-i*. Each card can be a container of content for organizing large amounts of information on an equal plane within the overview page 120. In some implementations, a user can rearrange the position of the cards 122*a-i* on the overview page 120. In some implementations, a user define, add, or delete cards included in the overview page 120.

An overview page (e.g., the overview page 120) can be a selectable application (e.g., from the launchpad 112) providing an integrated gateway into enterprise applications and application content included in the launchpad 112. The UI of the overview page (e.g., the overview page 120) can provide a user with a visual summary of data, links, actions, and content that are relevant to a business domain of expertise of a user and relevant to a selected role of the user within the domain. The visual summary can be presented in one or more cards (e.g., the cards 122*a-i*) that display live content to a user at-a-glance without the user having to open multiple applications and perform multiple drill downs through application content to find and present the content.

In some implementations, the overview page 120 can include a footer toolbar (e.g., footer toolbar 132 as shown in FIG. 1F). In some implementations, the footer toolbar can appear to float over the content displayed in the overview page 120.

In some implementations, an enterprise system can determine content displayed on an overview page (e.g., the overview page 120). In addition or in the alternative, a selection of one or more business domains and one or more roles of a user in the business or enterprise can determine content displayed on an overview page (e.g., the overview page 120). In some implementations, a user can make the selection using a settings UI included in a launchpad (e.g., the launchpad 112). In some implementations, a user can select one or more business domains and/or one or more roles of the user in the enterprise by way of an overview page (e.g., the overview page 120). Selecting one or more business domains and/or one or more roles of the user in the enterprise by way of the overview page can maintain absolute relevance to the individual user and the way in which the user works.

In some implementations, the user can personalize the layout and placement of one or more cards (e.g., the cards 122*a-i*) included in a UI of an overview page (e.g., the overview page 120) and the display of content included in each card. The personalization can enhance the workplace productivity of the user.

Figure 1E:
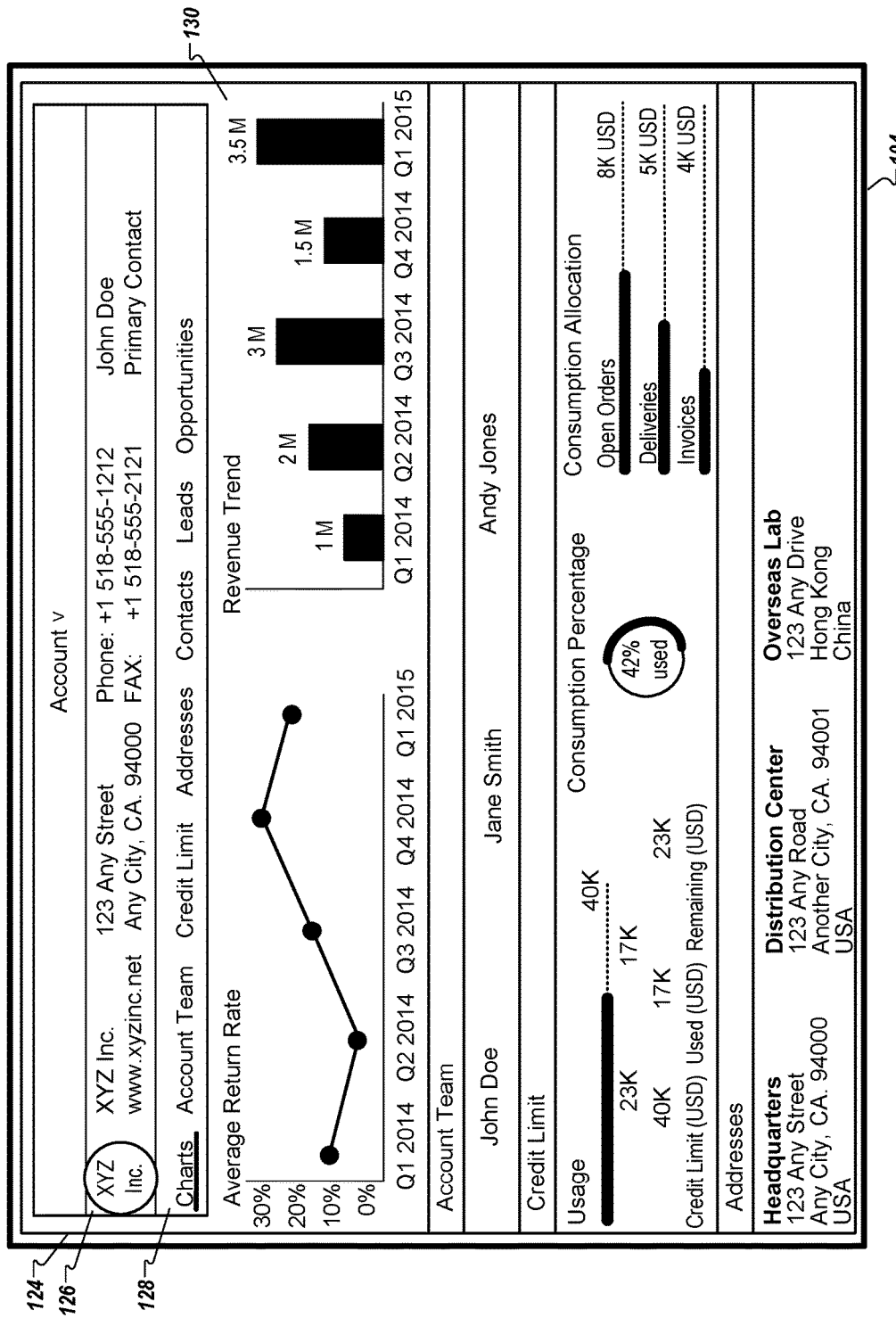
FIG. 1E is an illustration showing an example object page displayed in a shell main container.
Figure 1F:
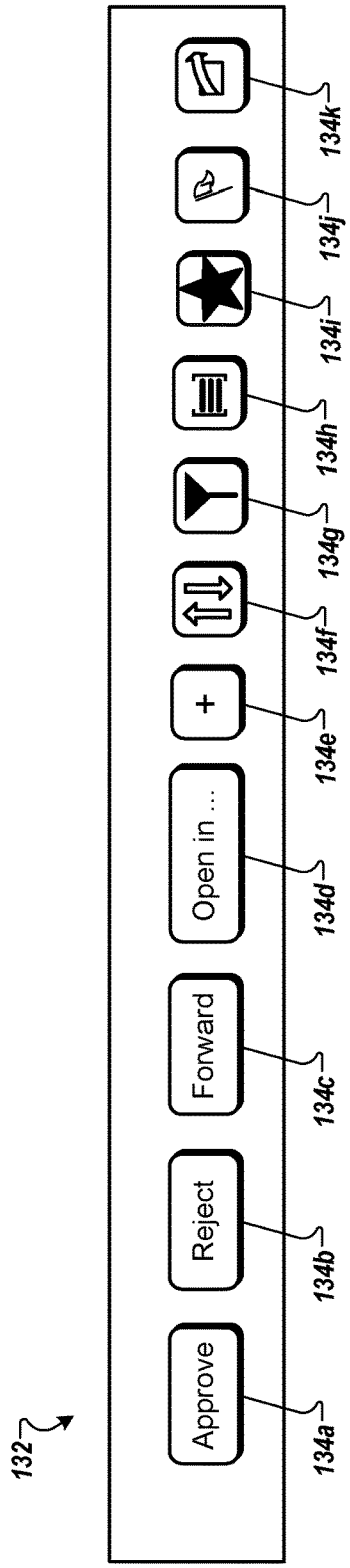
FIG. 1F is an illustration showing an example footer toolbar.

FIG. 1E is an illustration showing an example object page (object page 124) displayed in the shell main container 104. An object page can be a floor-plan used to represent objects in a UI. An object page can be used to display, create, or edit an object. An object can represent a business entity (e.g., a customer, a sales order, a product, an account, etc.). Enterprise applications that reflect a specific scenario (e.g., a sales order, am account status) can be bundled using an object. The object page can include a header area 126, a navigation area 128, a content area 130, and, in some implementations, a footer toolbar (e.g., footer toolbar 132 as shown in FIG. 1F). In some implementations, the footer toolbar can appear to float over the content displayed in the object page 124. For example, referring to FIG. 1C, a user can select the tile 114*f* and an object page can be displayed to the user.

FIG. 1F is an illustration showing an example a footer toolbar (e.g., footer toolbar 132). In some implementations, referring to FIG. 1A, the footer toolbar 132 can appear at the bottom of a screen displayed in the shell main container 104, the left container 102, and/or the right container 106. For example, as described herein with reference to FIGS. 1C-E, a footer toolbar (e.g., the footer toolbar 132) can be displayed at the bottom of the launchpad 112, the overview page 120, and the object page 124. The footer toolbar (e.g., the footer toolbar 132) can continue to appear at the bottom of the screen of the display area of the display device even as the displayed screen is scrolled. The footer toolbar (e.g., the footer toolbar 132) can appear to hover over or float over the content being displayed on the screen. The footer toolbar 132 can include buttons or controls 134*a-k*. The controls 134*a-k* can be selected by a user in order to perform one or more actions that can impact content included on the page being displayed on the screen. The controls 134*a-k* are examples of controls that can be included in a footer toolbar. In some implementations, the controls can be different, fewer than, or more than the controls 134*a-k*. The type and number of controls included in a footer toolbar can be based on the type of page being displayed and/or the content being displayed in the page.

Figure 1G:
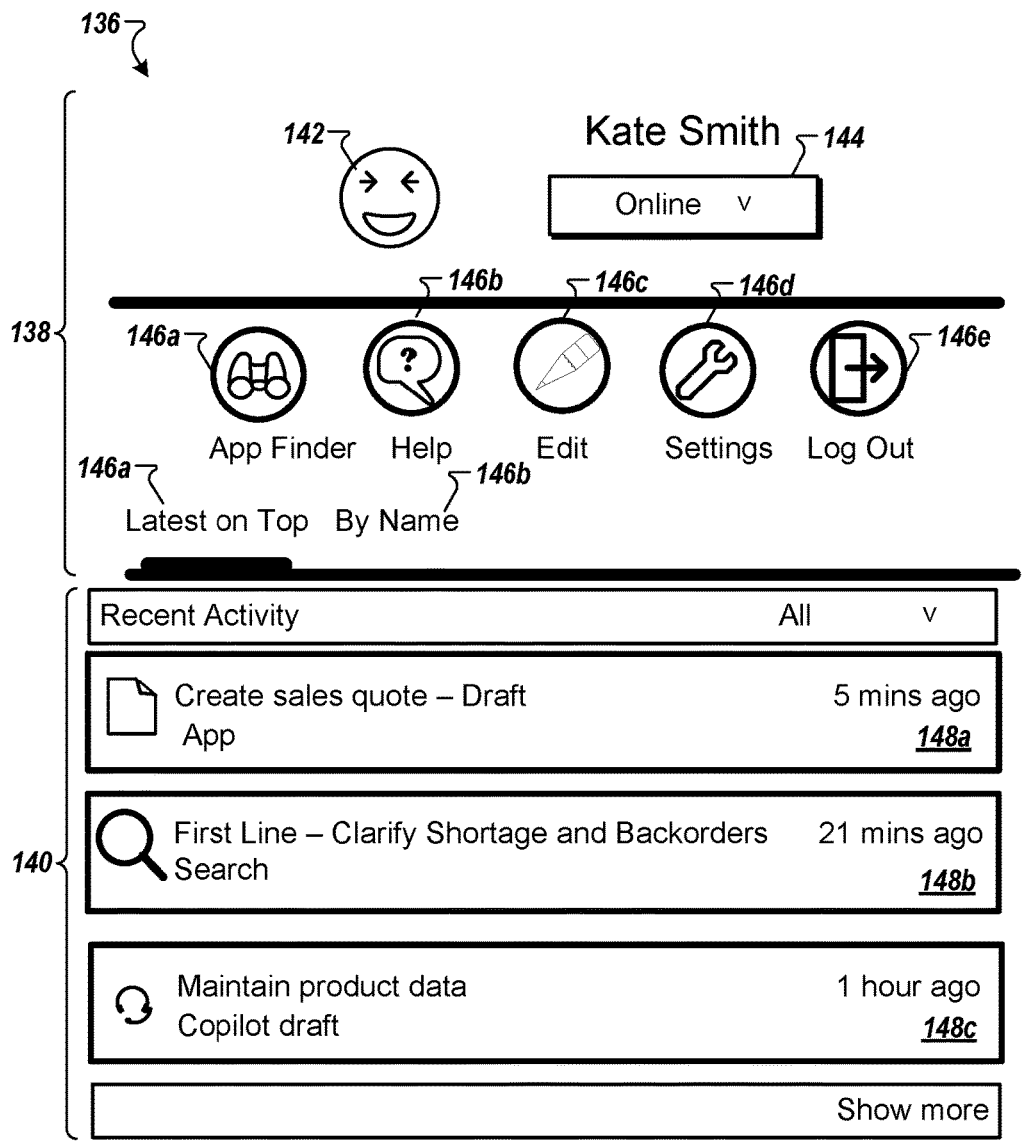
FIG. 1G is an illustration showing an example me area that can be displayed in a left container.

FIG. 1G is an illustration showing an example me area (e.g., me area 136) that can be displayed in the left container 102. In some implementations, the me area 136 can be displayed in the right container 106. The me area 136 includes an upper section 138 and a lower section 140. The upper section 138 includes a user icon 142. Selecting (clicking on) the user icon 142 can provide a user profile. A dropdown indicator button 144 displays a status of the user and, if selected, a user can logout of an application. The upper section 138 includes navigation targets 146*a-e*. Selection of (clicking on) a navigation target by a user triggers a corresponding functionality (e.g., an application) associated with a navigation target. The me area 136 can provide various generalized functionalities as they are related to a user.

The upper section 138 can include sort selections 146*a-b*. A user can select (click on) a sort selection (e.g., one of the sort selections 146a-b) to determine how the listing of the recent activities included in the lower section 140 will be sorted and displayed.

The lower section 140 of the me area 136 includes a list of recent activities 148a-c. The recent activities 148a-c can include links 156a-c, respectively, that when selected (clicked on) by a user can navigate the user to back to the shell main container 104, opening an application (or function) that corresponds to the link in the shell main container 104. Recent activity items can include, but are not limited to, enterprise applications, triggered searches, co-pilot collections, and co-pilot drafts.

Figure 1H:
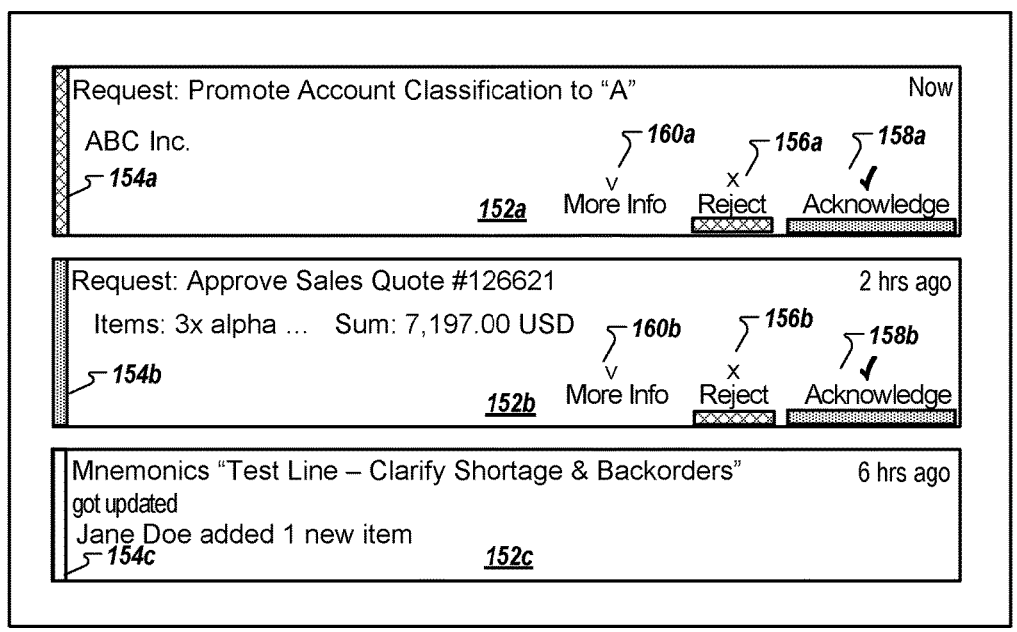
FIG. 1H is an illustration showing an example notification area that can be displayed in a right container.

FIG. 1H is an illustration showing an example notification area (e.g., notification area 150) that can be displayed in the right container 106. In some implementations, the notification area 150 can be displayed in the left container 102. The notification area 150 includes notifications 152 a-c. A user interacting with the UI in the notification area 150 can take immediate action on a notification. A notification item (e.g., notifications 152 a-c) can have an indicator (e.g., notification indicators 154a-c) that can indicate the status of the notification. For example, a notification indicator can be color coded to indicate a particular status of the notification.

A user can reject a notification by selecting (clicking on) a reject selection (e.g., a reject selection 156a-b). For example, a user can reject the notification 152a by selecting (clicking on) the reject selection 156a. The rejection of the notification 152a (the notification status) can be indicated by content included in (e.g., a color of) a notification indicator 154a. A user can acknowledge a notification by selecting (clicking on) an acknowledge selection (e.g., a acknowledge selection 158a-b). For example, a user can acknowledge the notification 152b by selecting (clicking on) the acknowledge selection 158b. The acknowledgement of the notification 152b (the notification status) can be indicated by content included in (e.g., a color of) a notification indicator 154b.

A user can drill down into a relevant application by selecting (clicking on) a more info selection (e.g., a more info selection 160a-b). In some cases, a user may contact someone directly in response to a notification.

Figure 1I:
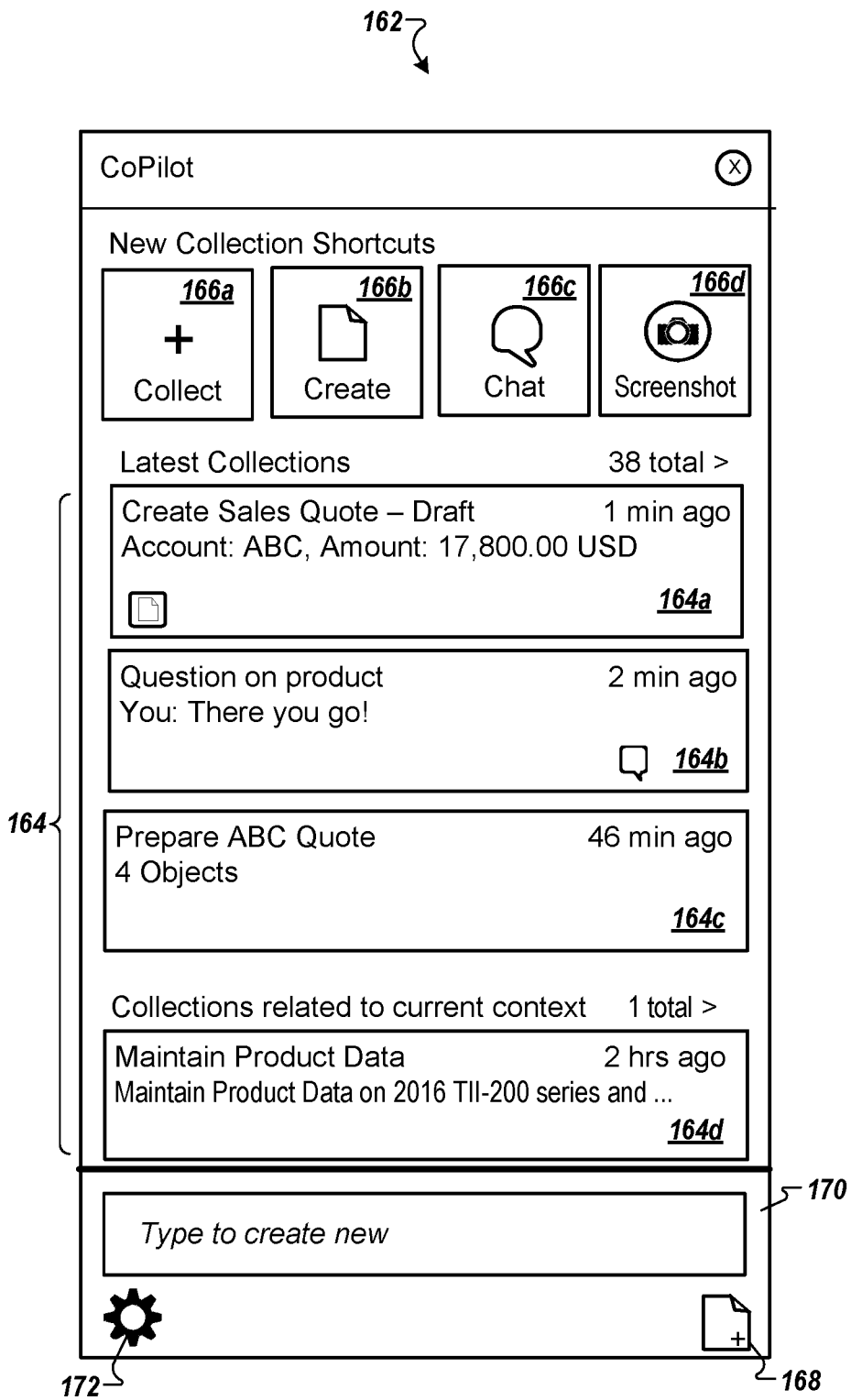
FIG. 1I is an illustration showing an example copilot user interface.

FIG. 1I is an illustration showing an example copilot UI (e.g., copilot UI 162). For example, referring to FIG. 1C, a copilot application can be launched from the launchpad 112 when a user selects (clicks on) the copilot launch icon 113. The copilot application can provide (generate and display) the copilot UI 162. In some cases, the copilot UI 162 can float over the UI included in the launchpad 112. As a floating UI control, the copilot UI 162 can be visually unobtrusive and flexible in its cross-functional omnipresent implementation across any device or application screen.

The example copilot UI 162 is an example copilot start page or start screen. The start screen (the copilot UI 162) can be an entry point for copilot functionality for an enterprise system.

The copilot UI 162 can provide shortcuts to different copilot features. For example, as shown in FIG. 1I, a collection can be represented by an entry in a collection list 164 that includes collection list entries 164a-d. A copilot collection can be a cluster of items in relation to a specific topic. For example, an item can be a note, a screenshot, a chat message, a copilot message, an object, or a quick create. In some implementations, the items included in the collection can be homogeneous (e.g., all of the items are of the same type). In some implementations, the items included in a collection can be non-homogeneous (e.g., the items can be of different types). Each collection list entry 164a-d can provide a representation of a collection that can include a title, a timestamp (e.g., last changed), a visual content summary, and a textual content preview. In some implementations, the collection list 164 can be searched and/or filtered.

For example, the selection of a copilot shortcut 166a-d can allow a user to create and navigate to a new collection with a specified intention. The selection of a copilot create icon 168 located in a copilot footer toolbar 170 can create and navigate to a new plain collection. The selection of a copilot settings icon 172 located in the copilot footer toolbar 170 can allow a user access to copilot settings (e.g., display a copilot settings UI, open a copilot settings application, etc.).

Copilot entries can be living, gradually growing artifacts and software entities that can accompany a user from the identification of an issue to a solution for the issue, while providing support in the form of relevant context and actions. Copilot entries can serve as memory aides while the copilot entries can incrementally evolve into valuable transactional tasks and collaborations as they mature in meaningful ways that bridge a gap between predefined application functionality and processes based on personal ways of working for a user. Though the example shown in FIG. 1I describes launching the copilot application from the launchpad 112, referring to FIG. 1A, the copilot application can be launched from other screens displayed in (included in) the shell main container 104, the left container 102, and/or the right container 106.

Copilot entries can be made ready for users to use when communicating, collaborating, and creating actionable transactions in desktop or mobile scenarios. For example, copilot text entries can be analyzed for recognizing and identifying relevant text related objects. Copilot text entries can emphasize displayed text, and a copilot application can recommend contextual entities for use in a current task. The copilot application can understand user context and can intelligently propose selections, auto-entries, and user options.

A smart template can provide a framework for generating user interfaces at runtime for an enterprise application. For example, a smart template can be used to generate the UI for the overview page 120 as shown in FIG. 1D. In another example, a smart template can be used to generate the UI for the object page 124, as shown in FIG. 1E. A smart template can provide a framework for generating the user interfaces based on metadata annotations and predefined templates for the most used application patterns. The use of smart templates can ensure design consistency by providing centralized high quality code by using predefined templates and controllers. The use of smart templates can keep applications up to date with evolving design guidelines. The use of smart templates can reduce an amount of front-end code used in building enterprise applications. The term "smart" can refer to annotations that add semantics and structures to provided data. The term "smart" can also refer to the way in which the templates understand the semantics.

Figure 1J:
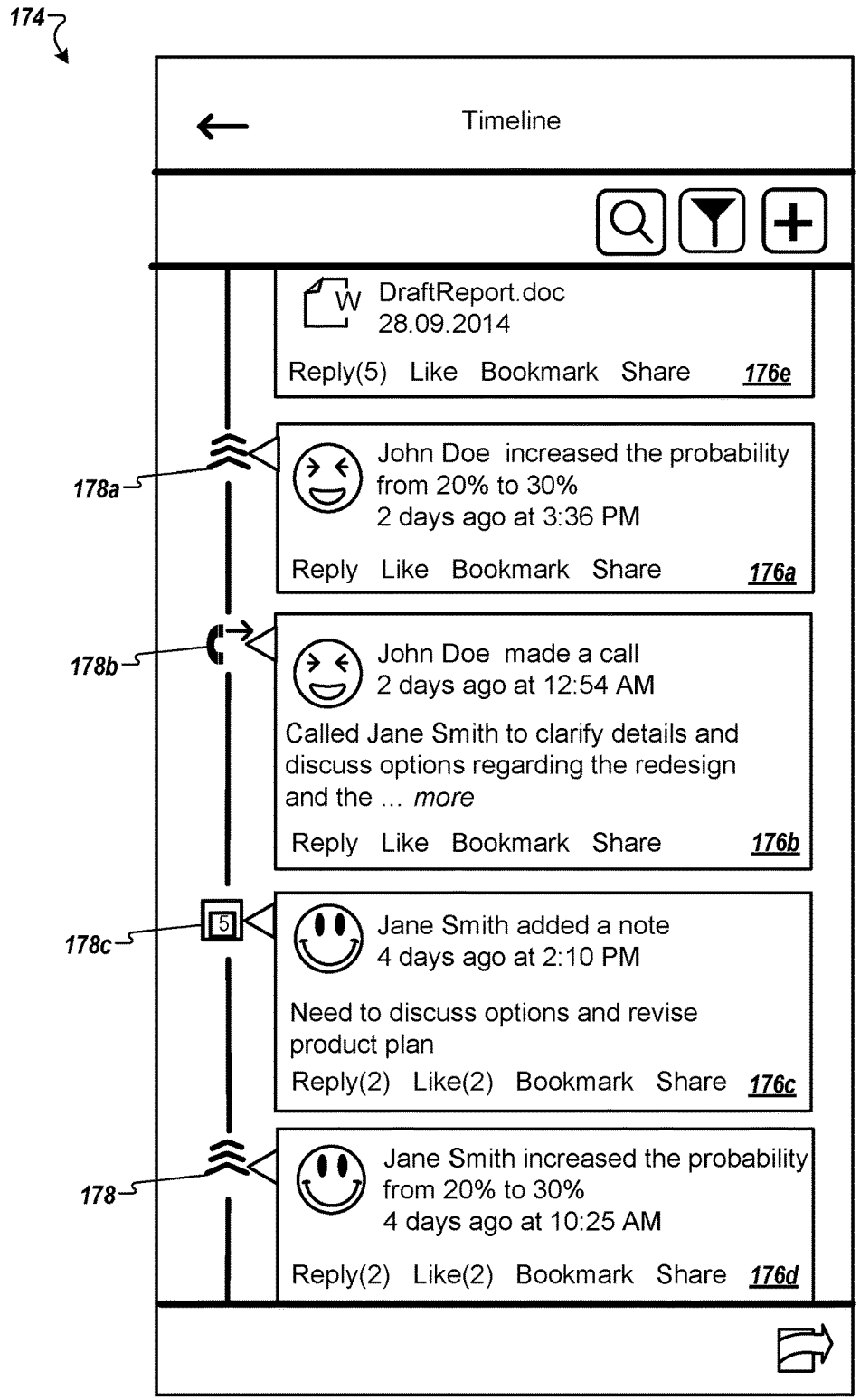
FIG. 1J is an illustration of a timeline user interface that can display timeline entries.

FIG. 1J is an illustration of a timeline UI (e.g., the timeline 174). A timeline UI (e.g., the timeline 174) can display timeline entries 176a-e. For example, the entries can be events, objects, and/or posts listed and displayed in a chronological order. The timeline 174 includes nodes 178a-d that correspond to respective timeline entries 176a-d.

The timeline 174 can be used for collaborative communications. The timeline 174 can be configured in multiple different ways depending on use case implementations. For example, the timeline 174 can provide information about changes of an object or about events related to an object. The timeline 174 can provide information about generated entries (e.g., value XY changed from A to B) or about manual entries (e.g., comments from an individual). In some implementations, the latest entry is at the top of a list displayed by a timeline. In some implementations, the timeline 174 can be displayed along with a business object. In some cases, the timeline 174 can be displayed to the right of the business object.

Two example versions of a timeline can include a basic timeline and a social timeline. A basic timeline can be a read-only timeline. A social timeline can allow for interaction and collaboration among users.

Figure 2:
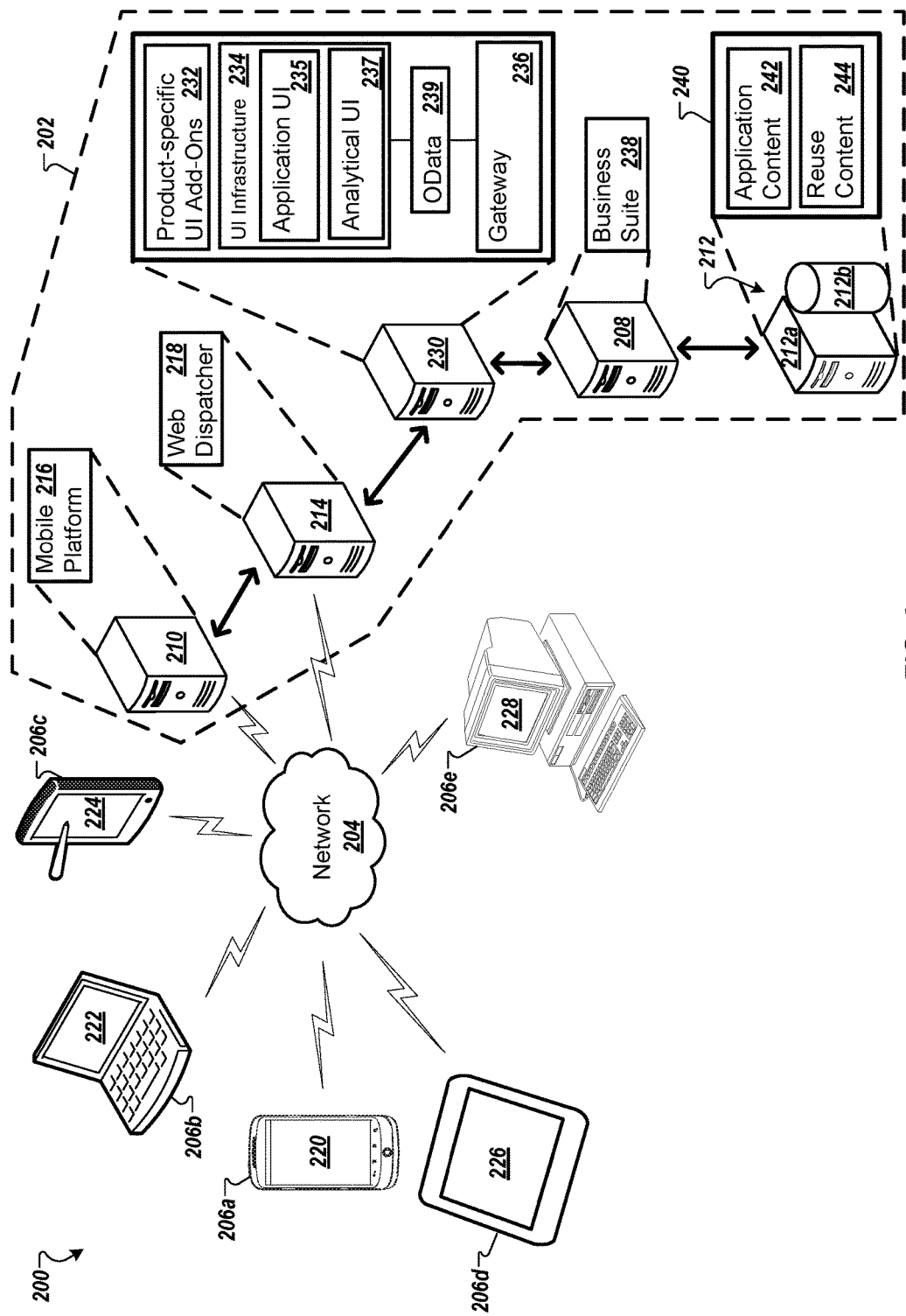
FIG. 2 is a diagram of an example system that can implement the user interfaces and user experiences described herein.

FIG. 2 is a diagram of an example system 200 that can implement the user interfaces and user experiences described herein. The system 200 includes an enterprise computing system 202, a network 204, and client computing devices 206*a*-*e*.

For example, computing device 206*a* can be a mobile phone, a smartphone, a personal digital assistant, or other type of mobile computing device. The computing device 206*a* includes a display device 220. For example, computing device 206*b* can be a laptop or notebook computer. The computing device 206*b* includes a display device 222. For example, computing device 206*c* can be a tablet computer. The computing device 206*c* includes a display device 224. For example, the computing device 206*d* can be a wearable device such as a smartwatch. The computing device 206*d* includes a display device 226. For example, the computing device 206*e* can be a desktop computer. The computing device 206*e* can include a display device 228. A user of the computing devices 206*a*-*e* can use/interface with the display devices 220, 222, 224, 226, and 228, respectively, when interacting with the enterprise computing system 202. The computing devices 206*a*-*e* can display on the display devices 220, 222, 224, 226, and 228 any of the screens and UIs described herein.

The enterprise computing system 202 can include one or more computing devices such as a web management server 214, a frontend server 230, a backend server 208, and a mobile device management server 210. The enterprise computing system 202 can also include a database management computing system 212 that includes a database management server 212*a* and a database 212*b*. Though not specifically shown in FIG. 2, each server (the web management server 214, the frontend server 230, the backend server 208, the mobile device management server 210, and the database management server 212*a*) can include one or more processors and one or more memory devices. Each server can run (execute) a server operating system.

In some first implementations, the client computing devices 206*a*-*d* (e.g., the mobile computing devices) can communicate with the enterprise computing system 202 (and the enterprise computing system 202 can communicate with the client computing devices 206*a*-*d*) by way of the mobile device management server 210. The mobile device management server 210 includes one or more mobile device platform application(s) 216. By using the mobile device platform application(s) 216, the enterprise computing system 202 can deliver cross-platform, secure, and scalable applications to the computing devices 202*a*-*d*, independent of the mobile computing device-type (e.g., laptop, notebook, smartwatch, mobile phone, PDA, etc.) and independent of the operating system running on the computing device 206*a*-*d*. In these implementations, the mobile device management server 210 can then communicate with the web management server 214.

In some second implementations, the client computing devices 206*a*-*e* (both the mobile computing devices (computing devices 206*a*-*d*) and the desktop computing device 206*e*) can communicate with the enterprise computing system 202 (and specifically with the web management server 214), and the enterprise computing system 202 (and specifically with the web management server 214) can communicate with each of the client computing devices 202*a*-*e*) using the network 204. The web management server 214 includes a web dispatcher application 218. In both the first implementations and the second implementations, the web dispatcher application 218 can act as a "software web switch" accepting or rejecting connections to the enterprise computing system 202.

In some implementations, the network 204 can be a public communications network (e.g., the Internet, cellular data network, dialup modems over a telephone network) or a private communications network (e.g., private LAN, leased lines). In some implementations, the computing devices 206*a*-*e* can communicate with the network 204 using one or more high-speed wired and/or wireless communications protocols (e.g., 802.11 variations, WiFi, Bluetooth, Transmission Control Protocol/Internet Protocol (TCP/IP), Ethernet, IEEE 802.3, etc.).

The frontend server 230 can include product specific UI Add-On Applications 232 and a UI infrastructure 234. The UI infrastructure 234 can include a design portion and a runtime portion. The frontend server 230 can decouple a lifecycle of a UI (e.g., design and runtime deployment) from the backend server 208. The decoupling can allow UI applications to interface with a plurality of different databases. The decoupling provides a single point of UI design, access, and maintenance allowing for theming, branding, configuring, and personalizing a UI without a need for development privileges to the backend server 208 (e.g., no need to have backend administrative rights). The decoupling can result in a more secure enterprise computing system. The decoupling can provide for rule-based dispatching of requests in a multi-system landscape (e.g., for approvals including aggregation).

The UI infrastructure 234 includes an application UI 235 and an analytical UI 237. The application UI 235 can provide any number of applications using the architectures described herein. The analytical UI 237 can provide analytical capabilities that can provide end-to-end business analysis including, but not limited to list reporting over multi-dimensional reports, dashboards, provision of analytical apps, and pixel-perfect formatted reports.

The frontend server 230 includes a gateway 236. The gateway 236 can provide a way to connect devices, environments, and platforms to enterprise software based on market standards. The gateway 236 can enable the development of UIs for use in different environments (e.g., social and collaboration environments). The gateway 236 can enable the development of UIs for use on different types of client computing devices (e.g., client computing devices 206*a*-*e*). The gateway 236 can enable the development of UIs for use in internet-based applications.

The frontend server 230 includes OData services (e.g., Open Data Protocol) services 239. OData services 239 are typically resource-oriented and all artifacts are network accessible objects that are identified by a Uniform Resource Identifier (URI) or an Internationalized Resource Identifier (IRI). The entry resource of an OData Service may be a service document. The service document may be the top level representation of an OData service. The service document may list entity sets, singletons, and functions of the same services. Resources provided in the service document may be accessed with a URL that may be the concatenation of the base URL and the resource URL. One example snippet of a service document is shown below: {"@odata.context":"$metadata", "value": [{"name":"Departments", "url": "Departments"}, {"name":"EMPLOYEES", "url": "EMPLOYEES"}, . . . ]}

In some implementations, OData services 239 may represent OData services that can provide aggregation services, dimensional services, measuring services, and parameter passing services. In some implementations, OData services can also provide analytical services such as currency conversion, formula calculation, totaling services, hierarchy analysis, and write-back services.

OData services 406 can be used to represent properties. Properties in an entity type annotated as dimensions can group data in the result set and control how other properties annotated as measures are to be aggregated. A set of selected dimensions defines an aggregation level that gets applied to the measures in the result. Properties associated with aggregated entities may be tagged with a corresponding annotation. In this case, the semantics of "$select" is extended to not only specify the shape of a result, but also an aggregation level for the result. The decision whether or not an entity type aggregates may be determined at design time and typically may not be changed by the consumer. Aggregation can be applied to any OData model by specifying the aggregation instructions in the OData request.

OData services 406 can be used to represent functions. Functions including sum, min, max, etc. may be applied to measures to calculate aggregated values for a selected level of aggregation. If a deviating aggregation function is used for some dimension, an exception aggregation can be defined for the dimension. The function may be applied and any exception aggregation can be hard-coded at model design time or can be overwritten by the consumer in an OData request. Arithmetic expressions (e.g., formulas) can include function calls for calculating new measures out of particular OData information.

OData services 406 can be used to represent currency conversion. Currency conversion may be used as a function for aggregating measures in data containing monetary values in different currencies. The conversion may use OData and may be built into the analytical model and supported by the analytic engines (e.g., engine 412). In some implementations, consumers can add conversion functions to the OData service 406, which can be referenced in the OData request.

OData services 406 can be used to represent aggregated entities. In some implementations, logic for calculating aggregated entities includes the use of certain input values. For example, parameterized aggregated entity types are accessed by a function import with all parameters in a particular parameter signature. Examples include a parameter for a target currency to aggregate amount values in business transaction documents that do have different currencies and/or a parameter for a key date to determine the exchange rate for the currency conversion. Parameters may be relevant for, but not limited to, analytical use cases and may additionally be used in transactional data.

In some implementations, totals may be aggregated entities that can be included in the actual result. They are aggregated at a higher level than the requested result and represent sub-totals at the specified higher levels or a grand total for the entire result. Examples may include a request for aggregated entities at level with dimensions Customer/Product/Year can include a request for sub-totals at the levels Customer, Customer/Product and a grand total. Totals can be requested by a custom query option.

OData services 406 can be used to represent leveled hierarchies and parent/child (P/C) hierarchies. Leveled hierarchies are generally composed of two or more dimension properties that form a hierarchy of fix depth. One example may include Country/Region/City. Aggregation along such a hierarchy can be achieved by adding some or all of its properties to the aggregation level. A P/C hierarchy for some dimension includes nodes. Each node can have an arbitrary number of child nodes. For example, hierarchies may be generated for product groups, cost centers, employees/manager, etc. In contrast to leveled hierarchies, P/C hierarchies can represent any sort of tree structure. Every node in a P/C hierarchy implicitly defines an aggregation level and all measures are aggregated accordingly. P/C hierarchies can be exposed by OData services 406 with annotations of the data aggregation extension. The latter also allows describing leveled hierarchies and offers additional runtime support for selecting interesting tree sections by dedicated P/C hierarchy filter functions such as isdescendant( ), isancester( ) etc.

OData services 406 can be used to represent write-back functionality. Write-back functionality refers to modifying measure values of an analytical result. Depending on the aggregation level of that value, it may be disaggregated and distributed to the contributing base data. Values can be modified interactively or by invoking a (planning) function that operates on a specified data scope and aggregation level to perform mass updates automatically. OData services 406 can provide the ability to write back values as advertised in updatability annotations in the service metadata.

The backend server 208 can include a bundle (a set) of business applications (e.g., business suite 238). The business applications can be transactional applications. analytical applications, and fact sheet and contextual navigation applications. Transactional applications can allow task-based access to tasks that can include create and change. In addition or in the alternative, transactional applications can allow access to entire processes with guided navigation. Analytical applications can provide a user with a visual overview of complex tasks for monitoring and tracking purposes. Fact sheet applications and contextual navigation applications involve search and explore activities. Fact sheet applications and contextual navigation can allow a user to view essential information about an object and can allow contextual navigation between related objects.

The database management computing system 212 includes a database management server 212*a* that can run (execute) applications that can manage a database 212*b*. For example, the database 212*b* can be an in-memory, column-oriented, relational database (e.g., SAP HANA®). The database management computing system 212 can include extended application services 240 that can embed a full featured application server, web server, and development environment within the database management computing system 212. The extended application services 240 can include application content 242 and reuse content 244 for use by the enterprise computing system 202 when providing a personalized, responsive, and simple UX across different types of computing devices and deployment options.

Figure 3:
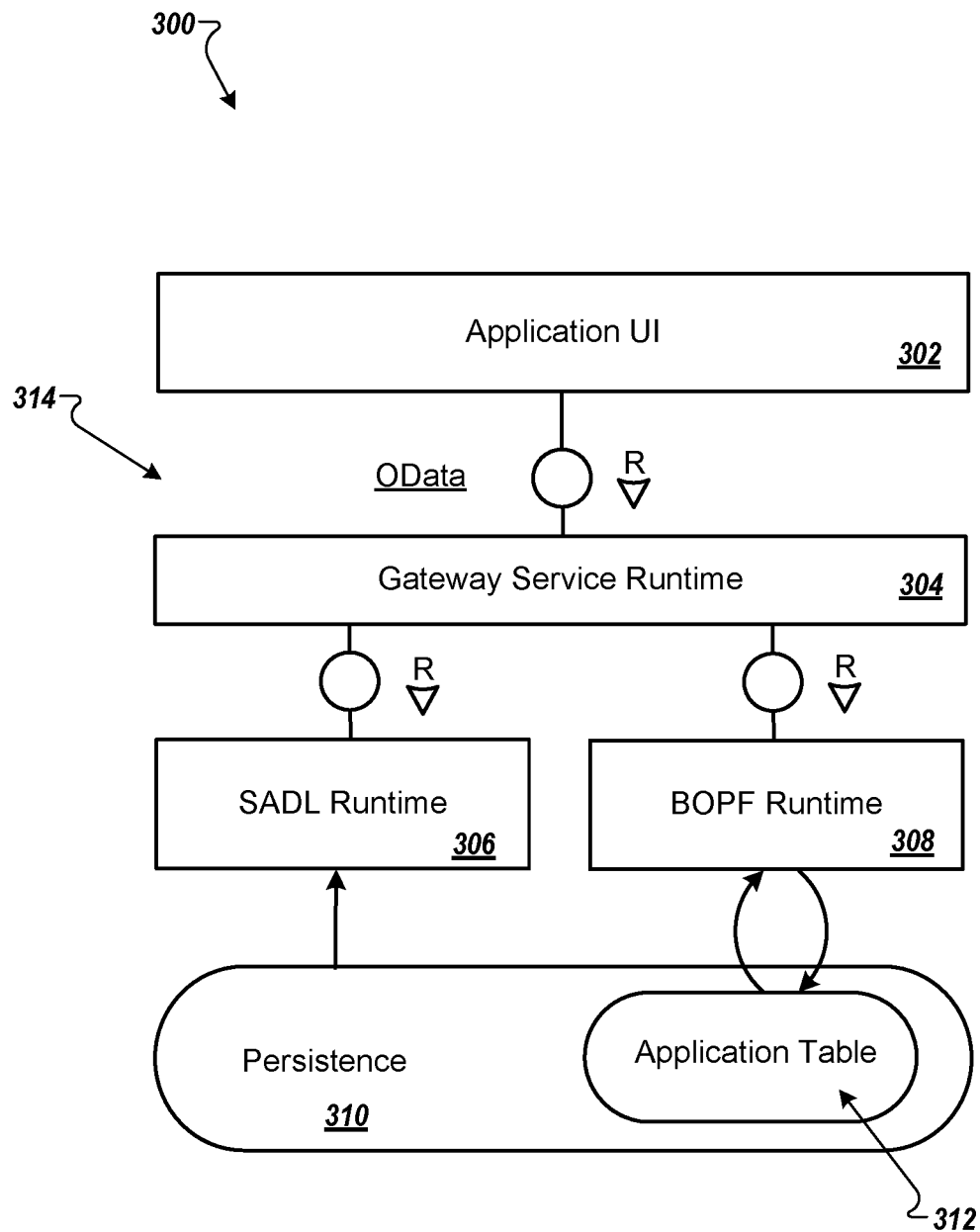
FIG. 3 is a block diagram of example architecture components utilized with OData services.

FIG. 3 is a block diagram of example architecture 300 illustrating components utilized with OData services. The architecture 300 may function in combination with architecture 200 (or in combination with other depicted architecture shown in this disclosure). In general, the programming model utilizing OData services in the architecture 300 enables read and transactional access to application data.

As shown, the architecture 300 includes an application UI 302 (e.g., application UI 235 (FIG. 2)), a gateway service runtime 304 (e.g., gateway 236 (FIG. 2)) and a Service Adaption Definition Language (SADL) runtime 306. The application UI 302 includes any number of SAP.UI5 components. The SADL is an ABAP technology that enables the consumption of entity relationship-like data models in ABAP based on a model-driven approach. In operation, SADL enables fast read access to database and data for scenarios on mobile and desktop applications using query push-down functionality.

The architecture 300 also includes a Business Object Processing Framework (BOPF) runtime 308. The BOPF runtime 308 is an ABAP based framework that provides a set of generic services and functionalities to speed up, standardize, and modularize development of applications. The BOPF runtime 308 may manage the entire life cycle of business objects and may cover all aspects of application development. The architecture 300 also includes a persistence database 310. The persistence database 310 may include any number of application tables 312 that represent application-specific data stored according to area of the architecture. The BOPF runtime 308 contains logic to eventually update application table entries within application tables 312. The gateway service runtime 304 may map read accesses to the SADL runtime 306 and write-accesses to the BOPF service runtime 308 calls.

In operation, the SADL runtime 306 translates read requests to corresponding SQL statements and executes the translated statements via the ABAP Query Interface on the persistence of core data service views. The core data service view is a metric that can be used for data modeling by S/4 HANA. The OData service 314 may be used to expose these models for consumption by one the application UI 302. In one example, OData services may be generated dynamically from particular core data service views without the need to implement a service provider manually. The selected design times and implementation provide OData exposure yielding a dedicated service for a selected view, and the gateway service runtime 304 supports referenced data sources that allow including multiple core data service views in one OData service 314.

Figure 4:
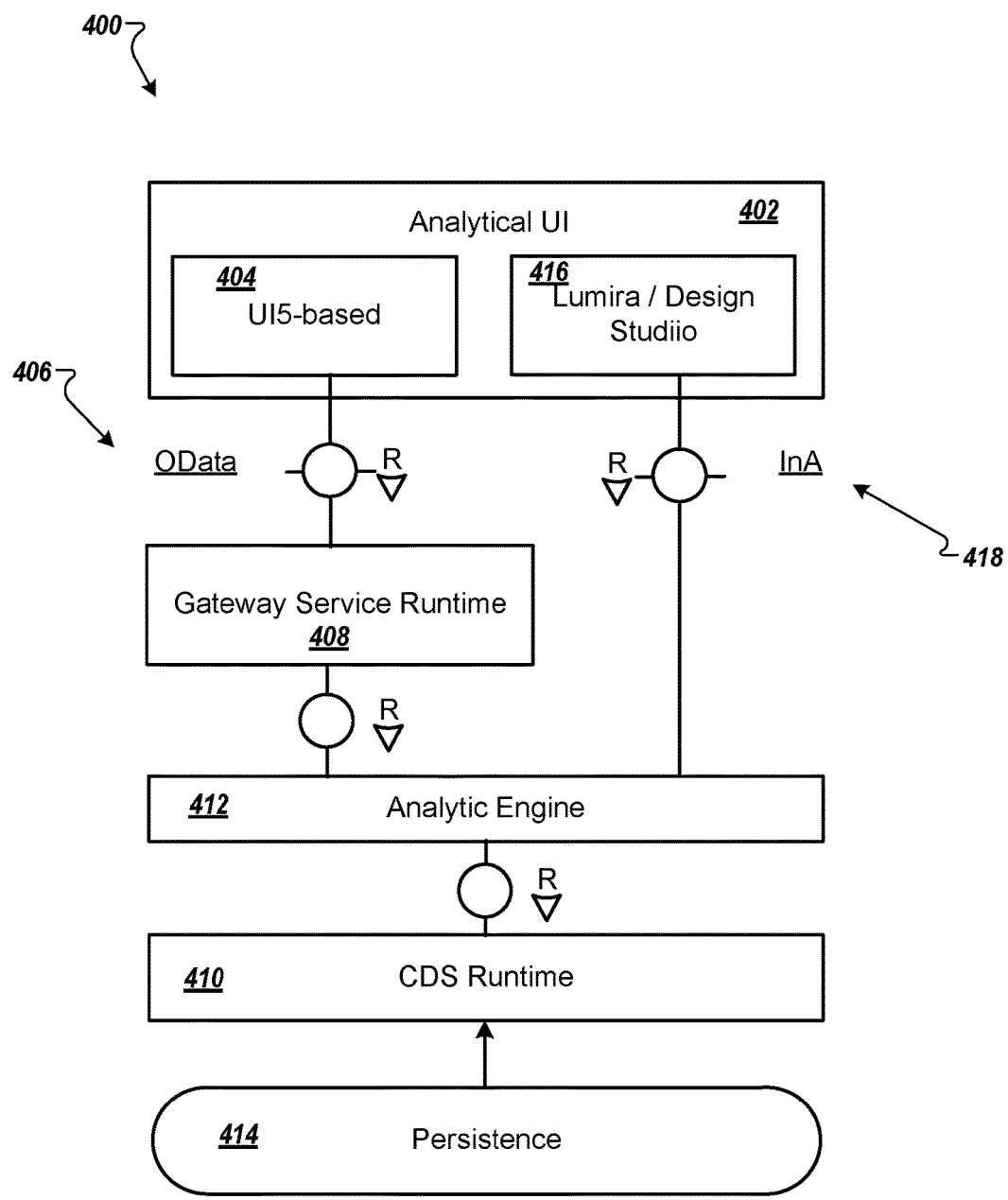
FIG. 4 is a block diagram of example architecture components utilized with OData services.

FIG. 4 is a block diagram of example architecture 400 illustrating components utilized with OData services. The architecture 400 may function in combination with architecture 200, and/or 300, (or in combination with other depicted architecture shown in this disclosure). Analytical capabilities can be carried out using architecture 400 to provide end-to-end business analysis including, but not limited to list reporting over multi-dimensional reports, dashboards, provision of analytical apps and pixel-perfect formatted reports.

The architecture 400 includes an analytical UI 402 built with (e.g., developed with) SAP.UI5 (e.g., UI5-based 404). The analytical UI 402 may utilize OData 406 to generate analytic content. For example, OData 406 can be used to expose analytical models using the model design times and access APIs.

The analytical semantics of OData models for these existing backend models can be expressed with annotations to the service metadata. In some implementations, OData 406 can include an extension for data aggregation. This extension covers all aspects of the analytical extensions. The extension can additionally provides capabilities that allow OData consumers to control analytical functionality with appropriate service requests at runtime.

A gateway service runtime 408 can generate initial support for services using OData 406, which provides data aggregation as well. The data model for analytics may be directly based on the primary application storage in order to achieve a seamless integration with transactional data in real time. For this purpose, a dedicated core data service views (associated with CDS runtime) with analytical annotations (generated by analytic engine 412 and persisted in persistence database 414) are put on top of other, lower-level core data service views and application tables.

In operation, analytical application UI 402 built with SAP.UI5 access analytical data from OData services 406 that forward the requests to the analytic engine 412. Other analytical applications can be built as well with design studio/Lumira 416. In addition, generic Lumira end user frontend may connect to the analytic engine via an information access (InA) protocol 418. In some implementations, the analytic engine 412 may access data via Open SQL from core data service views persisted data using (transient) multi-dimensional data structures derived from the underlying core data service views that do have analytical annotations. As a result, much of the analytical consumption is based on OData 406 and may be based on analytical access to core data service views with the same data models and storages as transactional scenarios.

In some implementations, OData services 406 can be used to represent lists and charts. For example, OData services 406 can provide information structured by a parent/child hierarchy which can be displayed in a tree table UI that provides comparable functionality. Operational reporting on business documents, work items, etc. can begin with such table UIs. In addition to standard functionality for sorting, filtering, and paging, the analytical table can group the displayed items on all available dimensions, measures, which are automatically aggregated. Chart UIs rendering the same information in one of many chart types (e.g., line, column, pie, etc.) complement such table UIs. Users can switch instantly between tabular and chart display by connecting to any aggregating OData entity set. If a particular OData service also supports totals, the grouping performance can be further improved by fetching multiple group levels with a single OData request.

Figure 5:
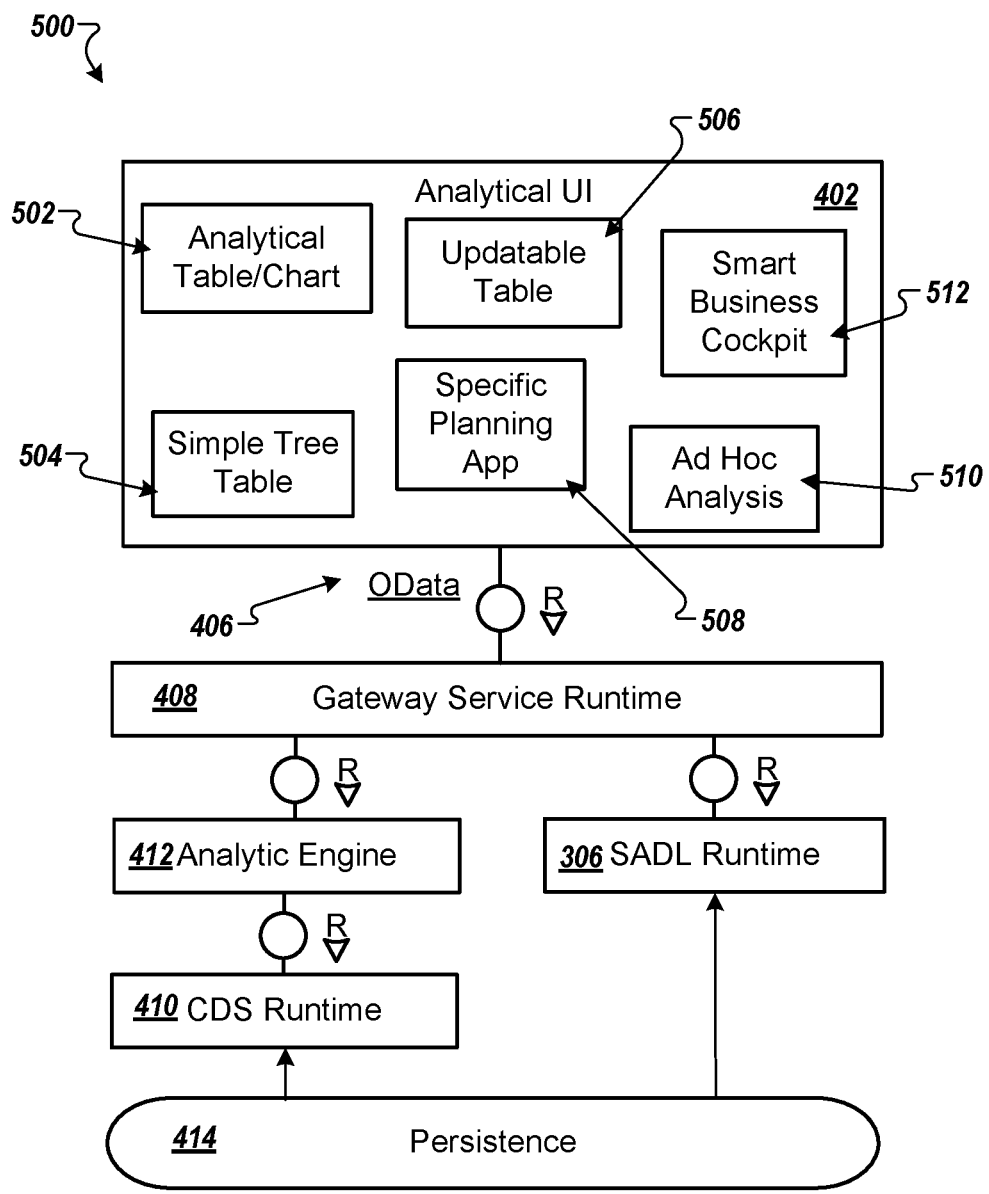
FIG. 5 is a block diagram of example architecture components utilized with OData services.

FIG. 5 is a block diagram of example architecture 500 illustrating components utilized with OData services. The architecture 500 may function in combination with architecture 200, 300, and/or 400 (or in combination with other depicted architecture shown in this disclosure). As described above, the architecture 500 also includes an analytical UI 402, a gateway service runtime 408, an analytic engine 412, an SADL runtime 306, a CDS runtime 410, and persistence database 414.

The analytical UIs 402 may provide analytical tables 502, tree tables (e.g., hierarchies) 504, updateable tables (e.g., write-back) 506, specific planning applications (e.g., write-back) 508, and ad hoc analysis (e.g., using OData data aggregation) 510.

On the server side, two components can serve analytical OData services 406. The analytic engine hosting the analytic UI 402 is based on OLAP technology. The CDS runtime views 410 with analytical annotations are translated to queries, for which OData query services can be provided on top. All these transformations occur at runtime and map metadata from one layer to the other without creating redundant models. The analytic engine offers data grouping, analytical aggregation, formula calculation, currency conversion and totals, includes a hierarchy engine and planning functionality. Therefore, with this generic approach, the analytic engine can make basic and all advanced analytical OData features available.

The SADL runtime 306 can also generically expose analytical OData services for CDS runtime views 410 with @DefaultAggregation annotations. Ultimately, SADL maps incoming OData requests to SQL statements executed via the ABAP Query Interface (supporting HANA but also any database). Hence, by using standard SQL features for grouping and aggregating and not the ABAP runtime, stateless requests can be processed very fast, with the restriction that it supports only the basic analytical features also present in SQL.

In some implementations, the architecture 500 can provide a multi-dimensional report UI that allows exploration of a given data set. Data sets can be sliced and diced according to multiple dimensions in order to look at the data from different angles. Such reports consume data in a cell-oriented way (like in a pivot table) as opposed to the row-oriented results in an OData entity set.

In some implementations, the architecture 500 can include a smart business cockpit 512 that offers real time visualization of key performance indicators (KPIs) including trends, thresholds and alerts. It includes a standard method for multi-level analysis and integrates with other analysis and collaboration tools. A tile (not shown) on the cockpit may depict one or more KPI values. Every such KPI value is a measure value aggregated over available dimensions. The KPI analysis steps offer various rendering options for selected measures and aggregation levels. Therefore, smart business cockpits 512 can be supported by the basic analytical OData features.

In some implementations, the architecture 500 can provide pixel perfect reports (sometimes also referred to as "Reporting"). are required by almost every customer. Use cases are ranging from structured but nicely formatted cost center reports to externally used annual reports or infographics. Typically, a user uses a reporting tool to define the report, which is then rendered in various formats (PDF, RTF, HTML, . . . ) or made available through a (proprietary) viewer application to an end user. The tools usually operate directly on HANA views or queries. The formatting is then stored in the design time file in a proprietary format.

In some implementations, the architecture 500 can provide planning applications which refer to a class of applications that typically update data on aggregated levels. It starts with an ordinary write-back capability integrated into a simple list of aggregated measures in editable columns. At the other end of the spectrum, sophisticated planning applications for specific business purposes combine manual value entry with the option to perform mass-updates of values.

In some implementations, the architecture 500 can provide ad-hoc analysis that is characterized by the fact that similar to the multi-dimensional reporting, users do not necessarily know where the analysis path will lead them or on which data to focus in the beginning. While for a multi-dimensional reporting, the data set (an entity set in OData) is fixed and therefore not extensible during the analysis, it is part of the ad-hoc analysis that the interesting entity set is authored on-the-fly at runtime from the available entity sets and the possible navigations between them. In addition, this may also include the definition of calculated measures.

In operation, the OData service provider is based on an API used for consuming queries. Such queries suggest highly interactive and possibly data-intensive use cases and therefore rely on a state-ful analytic engine. In order to optimize stateless OData access to the state-ful processing in the analytic engine, quite some effort had been spent in the past to introduce shortcuts for the row-oriented data access. The architecture 500 may provide options for utilizing a gateway soft state in order to leverage the engine's cache of hierarchies and query results.

In general, the SADL runtime 306 is a transformer, which maps OData requests to corresponding (HANA) SQL statements; it may not implement extra functionality on top and is therefore limited to the capabilities provided by (HANA) SQL. SADL runtime 306 provides a faster initialization of metadata access and authorization check, which prepares for a session with state-ful interactions by maintaining certain buffers for subsequent reuse, for example. Furthermore, the SADL has a relational access to data that can be copied to the OData result very fast, because it perfectly matches the OData result structure. The analytic engine internally represents query results in a grid and processes data cell by cell when adding it to the output result, which yields a slower throughput.

At design time, during the activation of an analytical CDS view to be published via OData 406, the analytical CDS annotations can be introspected in order to determine the required feature level. For example, if a CDS view contains the @Analytics.query:true annotation and a @Hierarchy annotation, it can be executed by the analytic engine. Without the @Hierarchy annotation, it can also be executed by the SADL runtime. Of course, this is only a simplified example; for a proper decision a complete set of rules for all relevant CDS annotations can be identified and discussed.

The performance of architecture 500 can be further optimized by deferring the decision about the service implementation to runtime. Assuming a service provider that can delegate an incoming OData request to either execution runtimes, an OData request can be executed by the faster SADL even though the analysis at design time has shown that the CDS view contains annotations that require the analytic engine. As an example, consider the case of a @Hierarchy annotation. As long as a concrete OData request does not reference the OData entity type properties related to the hierarchy, it can be executed by SADL (if all other conditions are met as well). Another example is a CDS view with annotated write-back capability (at time of writing, this annotation had not yet been finalized). While OData updates are typically processed by the analytic engine, all OData read requests could be served by SADL. In order to freely exchange the service implementations case by case, both implementations expose an identical service structure and identical OData request/response pairs to provide consistency.

Consistency in this context refers to the expectation that an analytical OData service for a CDS view has an immutable structure and a unique runtime behavior. These aspects cannot be taken for granted when multiple service providers come into play: SADL's processing logic is entirely based on (HANA) SQL, while the analytic engine uses Open SQL for accessing data and further logic implemented with ABAP for processing. Regardless which service provider is selected for a given request, both must produce the same service document and metadata document. Names for entity types, properties, entity sets and function imports must be identical. All model structures are to be identical.

At runtime, SADL and the analytic engine produce the same results for the same requests. This includes (1) returning the same set of aggregated entities, and the implementations of the aggregation function they apply to measures return the same values (2) if a measure to be aggregated is associated to a unit or currency that is also included in the result, both runtime implementations return the same values for them (3) measure calculations may cause arithmetic errors that must not lead to rejecting the request (broken measure values must be represented by constants INF and NaN as appropriate), and (4) since the provider selection can be deferred to runtime, both return identical IDs as keys for the returned aggregated entities.

The ABAP Application Infrastructure may provide for three approaches creating analytical OData services: classic SEGW, OData exposure via CDS tooling, and OData exposure via SEGW.

An SEGW project is the starting point for this approach. The entire model of the service is defined within the project. OData entity sets can be mapped to a variety of modeled data sources, e.g., CDS views, DDIC tables, external DDIC views for HANA views. Analytical extensions from OData4SAP can be added manually to the model provider extension class of the service provider (MPC_EXT).

The OData exposure via CDS tooling approach starts with a selected CDS view that shall be exposed via OData. CDS tools allow to expose a CDS view via OData by adding a simple annotation: @OData.publish:true. Whether the resulting OData service will include analytical extensions is determined by the annotations of the exposed CDS view. If the CDS view contains annotations for analytical consumption (@Analytics.query:true) or aggregation of measures (@DefaultAggregation), an analytical OData service will be exposed. A mapping from CDS annotations to analytical OData4SAP extensions can be defined and used. Whether the analytic engine or SADL will serve requests against the analytical OData service at runtime depends on the analytical capabilities and is transparent for the application developer at design time.

The OData Exposure via SEGW approach has the restriction that only the canonical transformation from CDS to OData can be performed. More complex services with CDS OData exposure are supported by the SEGW with the concept of referenced data sources. With this, an SEGW project can reference one or more CDS views and associations between them and expose all of this to OData in a single service.

While the OData exposure via CDS tooling centers on the data model, the OData exposure via SEGW allows defining a service tailored to specific UI needs such that all required entities are accessible from a single service. Regardless of that both exposure approaches apply the same transformation of CDS to OData.

If analytical data is to be consumed in integration scenarios with other applications, the OData service acts as known and accessible consumption endpoint. The actual consumption use case may be known or unknown, but cannot be controlled. Any component that wants to consume analytical data from a Fiori application system must understand the OData extensions (metadata annotations, model structure) for analytics described and referenced in this document.

Figure 6:
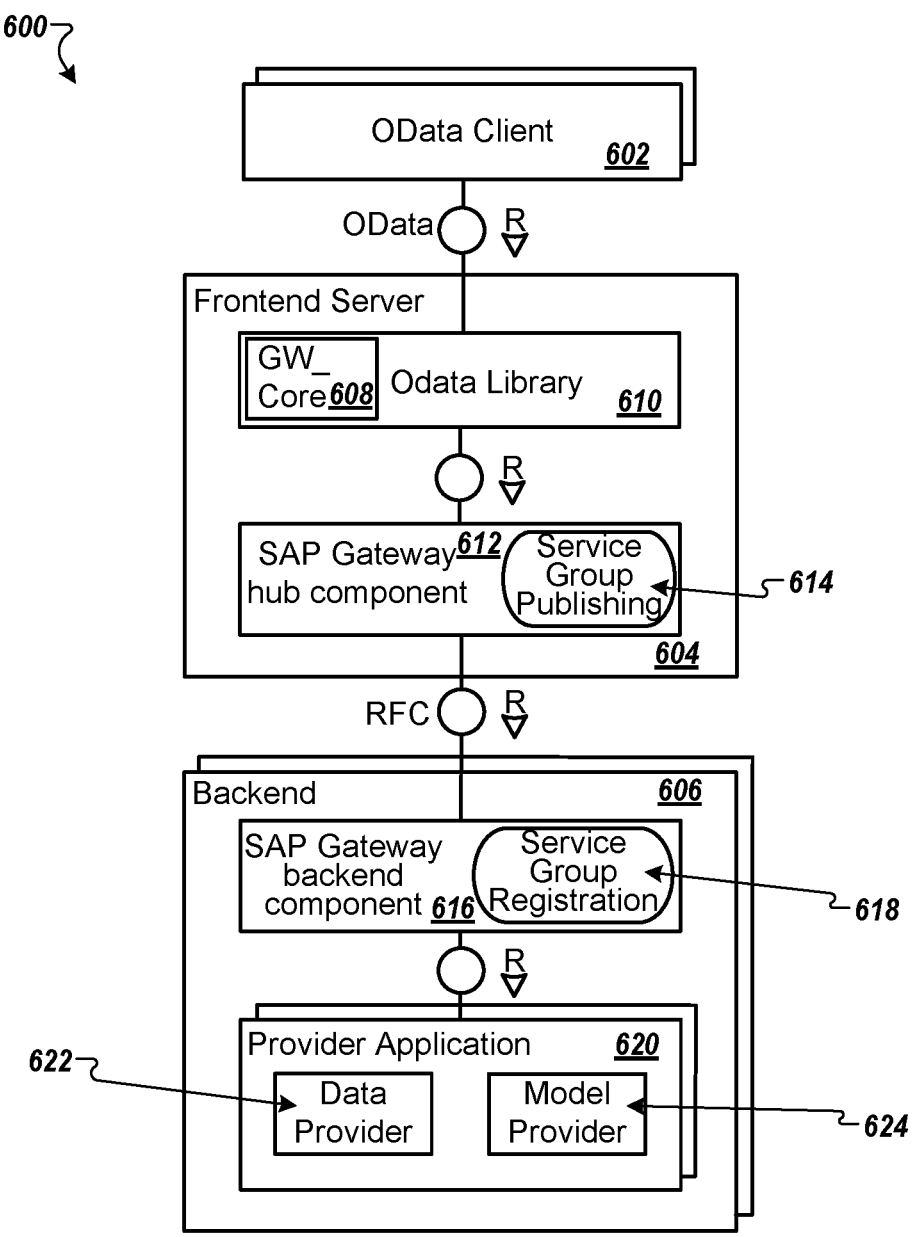
FIG. 6 is a block diagram of example architecture components utilized with OData services.

FIG. 6 is a block diagram of example architecture 600 components utilized with OData services. The architecture 600 may function in combination with architecture 200, 300, 400, and/or 500 (or in combination with other depicted architecture shown in this disclosure).

As shown, the architecture 600 includes an OData client 602, a frontend server 604, and a backend server 606. The frontend server 604 includes a GW_Core 608 that contains the OData library protocol 610. The frontend server 604 also includes a gateway hub component 612 that includes service group publishing 614. The hub components 612 can run on a different ABAP server than the corresponding backend components 616. A server with the hub components 612 can even be connected to several backend systems (containing the SAP Gateway backend components 616) and will then, for example, handle the routing (which backend system to connect to for a certain request) and data federation (retrieving data from several backend systems to compose it to one response). Other hub components are for example tools like the OData service publishing and the OData test tool called Gateway Client. This may be referred to as a Gateway hub component irrespective of the deployment scenario, i.e. also if it is not used as a hub.

The backend server 606 contains the SAP Gateway framework backend components 616. These are, for example, the interfaces a provider application implements, the service registration 618, and the design time tool Service Builder (SEGW). The backend server 606 also includes provider applications 620. Provider applications 620 include data providers 622 and model providers 624. The provider applications 620 can provide a data provider class (DPC) provides the business data access of your service.

The gateways 612 and 616 can provide the following functionality to reduce runtime consumption (e.g., resource usage): metadata cache on the hub component, metadata cache on the backend component soft state functionality, soft state based query result cache (SQRC), RFC shortcut for co-located deployments, parallelized batch processing, parallelized Multi Origin Composition processing, and delta handling support.

Attributes of metadata artefacts are set through specific methods. They default or reset other attributes if required. They also implement early checks that lead to immediate exceptions in case of failure. For example, a CREATE-method throws an exception if the given name does not comply with the naming conventions or has already been used. During finalization, model issues are detected if defaulting or derivation algorithms fail. After finalization the framework executes a comprehensive model validation.

Figure 7:
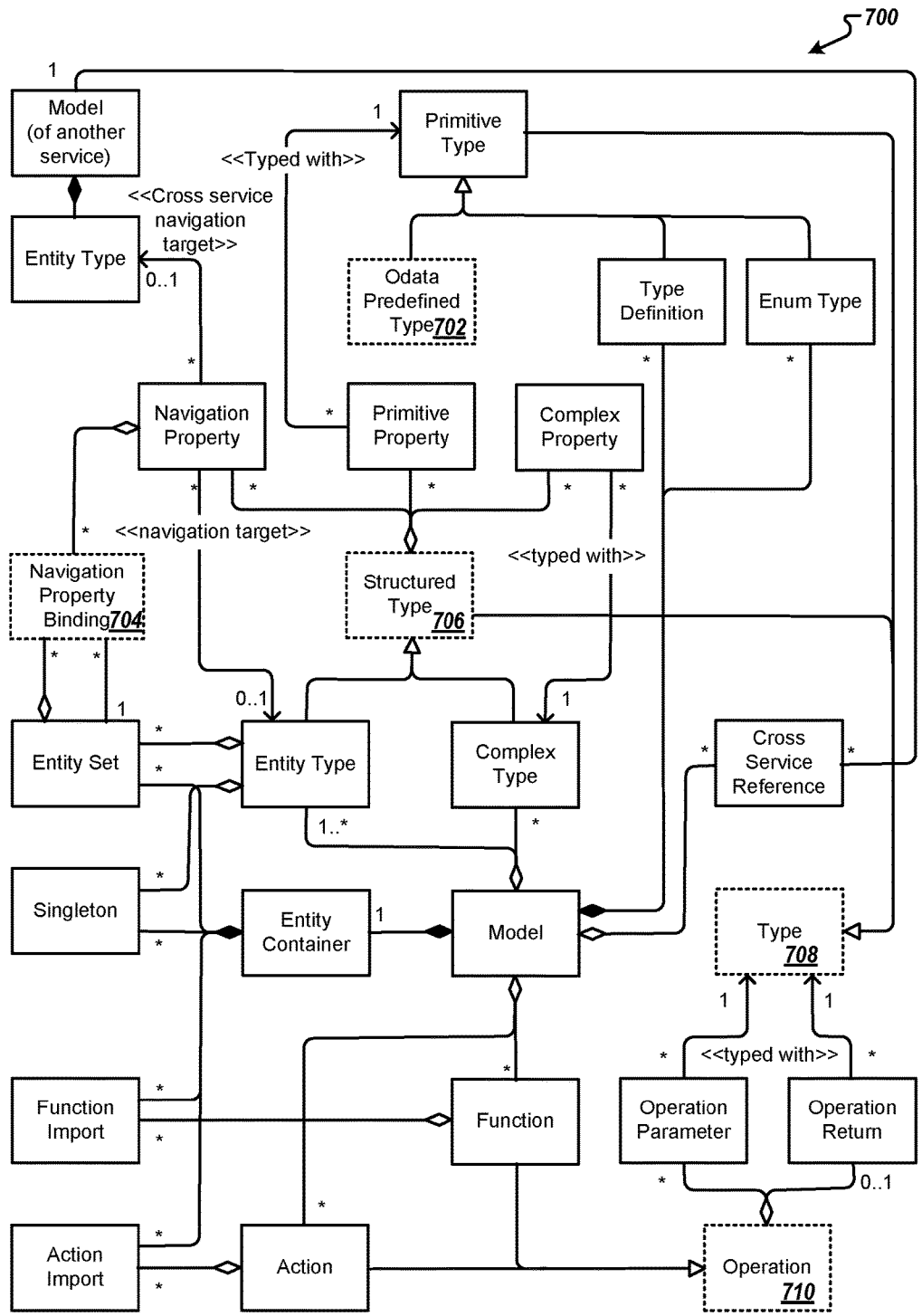
FIG. 7 is a block diagram example metadata artefacts of a model according to architectures described throughout this disclosure.

FIG. 7 is a block diagram example metadata artefacts of a model 700 according to architectures described throughout this disclosure. The metadata artefacts of model 700 depicts an entity relationship model of the metadata. In particular, model 700 describes a gateway-specific implementation of that model. The entities in dashed boxes 702-710 represent virtual entities. For example, both entity types and complex types may contain primitive, complex, and navigation properties. /IWBEP/IF_V4_MED_ENTITY_TYPE and /IWBEP/IF_V4_MED_CPLX_TYPE will have the same methods to create or retrieve properties.

The gateway described herein supports a full caching of the metadata which significantly increases the performance of a request which is sent through SAP Gateway. Three different access scenarios are possible: (1) A client requests the OData service document or the OData service metadata document (2) The SAP Gateway hub runtime needs to access the metadata to process a request or (3) The SAP Gateway BEP runtime needs to access the metadata to process a request. The SAP Gateway delivers functionality for all these scenarios by providing a three-level caching strategy. The caching is controlled by the time stamp which is calculated in method /IWBEP/IF_V4_MP_ADVANCED~GET_LAST_MODIFIED of the corresponding model provider.

In operation, a client requests the service document or the service metadata document. To support HTTP standard techniques SAP Gateway sets the HTTP response header for service (metadata) documents according to the HTTP caching standards (Last-Modified). This parameter enables the Web infrastructure components (for example, a Web server and browser) to answer requests out of their caches if the resources have already been requested before.

If the request cannot be answered by the Web infrastructure cache or if the SAP Gateway hub runtime needs to access the metadata itself (for example for a read of a feed), it is checked if the metadata of the current service is already present in the metadata cache on the hub. If it is present and up-to-date, the metadata is directly retrieved from the cache. Otherwise the metadata is read from the assigned backend system. The metadata cache on the hub can be disabled. This is useful for development landscapes avoiding any side effects caused by the metadata cache.

If the request cannot be answered from the Web infrastructure cache and cannot be answered from the metadata cache on the hub—or if the SAP Gateway backend runtime needs to access the metadata itself (for example for a read of a feed)—it is checked if the metadata of the current service is already present in the metadata cache in the backend.

In general, services are development objects with two key fields (1) service ID (e.g., 36 characters) and (2) Service version (e.g., 4 numerical characters). The service ID contains an ABAP namespace. The services can be generated and then registered.

The architectures described herein can provide service registration. For example, once model provider class and data provider classes are developed, the OData service can be registered. The registration, together with the implementation classes, can then be transported and shipped to customers. There are two ways to register a service. A first way includes creating a corresponding entry in the gateway (default) service repository because the gateway offers a separate registration UI as well as integration with the service builder. If the service is instead developed using the service builder, the service can be registered using service builder. In general, service repositories are identified by a CHAR 10 repository ID (without an ABAP namespace). The default gateway repository has the ID "DEFAULT." There will be no generic registration (like e.g., a control table) for repositories. Instead the supported repositories will be hard coded in the gateway coding because there will be only very few service repositories and this will enforce a review by the gateway development team for new repository providers.

A service repository implements an interface with methods like GET_SERVICES_BY_FILTER, DOES_SERVICE_EXIST, GET_DPC_AND_MPC_FOR_SERVICE, and/or GET_SERVICE_INFO (e.g., description). Services may be grouped together to allow the administration (e.g., publishing, routing and authorization maintenance) of all services in this group at once. For example, the routing can be defined for the service group and not for single services.

In general, the service group is part of the OData service URI. A service group can contain several services and may be assigned to several service groups. Services of different service repositories can be assigned to the same service group. Service groups may not necessarily support versions. The assignment of a service to a service group is version independent. Services groups are generally development objects with at least one key field.

A service may become a member of a service group when the service is explicitly assigned via the gateway service group definition UI as a top level service. A top level service contains primitive properties that are linked to an F4 help service. Each of these F4 help services will be added automatically to the service group. These services will then be directly addressable in the context of the service group.

Activities can be customized for service groups. For example, the following list of activities can be performed on a service group level: publishing on the hub, routing on the hub, start authorization check on the hub, and start authorization check in the backend. The gateway supports requests spanning across several services if all services are assigned to the service group which the URI of the request references. For example, a BATCH request containing operations for entities from different services might be supported as long as all services belong to the same service group. In another example, a GET request with a navigation starting at an entity type belonging to a different service than the entity type the navigation end at is supported. In yet another example, a GET request with an expand containing entity types from different services is supported.

The gateway supports different feature versions for the same service. This is controlled via segment parameters. The version segment parameter in the URI of the service, for example "v=2", indicates a request to a specific service version. Multiple origin composition is the ability to collect data from different backend systems, aggregate them in one single service and update different backend systems while using the same user. Thus, a service can be made available for several system aliases. This is requested via segment parameter "mo." In the URI of the service, the origin segment parameter can be used (e.g., "o=System_Alias_1") to identify the backend system the request shall be routed against. In some implementations, the usage of segment parameters may be restricted by allowing one one segment of the URL segment parameters to be used. Commas may be the delimiter used as separators. The segment parameters are to be used on a segment below the segment (ICF node) where the ICF handler—in case of Gateway class /IWFND/CL_OD_ROOT_HANDLER—is registered.

The gateway supports navigation between entities in different services. In the model provider of a service A, a service reference can be defined to a service B. With this, a navigation property (e.g., NavPropA2B) can be defined pointing from an entity (EA) in service A to an entity (EB) in service B. A client can then request a navigation like using . . . /EA(<key>)/NavPropA2B.

The gateway supports Simple Field Extensibility (SFE). To enable an entity of a particular service for SFE, a user can define, in the MPC, the entity based on a DDIC structure. The DDIC structure contains an extendable, flat INCLUDE structure. The MPC provides the name of the include structure via a method like ADD_AUTO_EXPAND_INCLUDE. The method can be called several times, i.e., for each entity several include structures can be used for SFE. During runtime, the gateway adds all fields of these include structures as properties into the entity type. The properties are added like "normal" properties, i.e. flat, i.e. not grouped within a complex property. If a property already exists (e.g., because it has been added explicitly) it is not added again. These properties may be annotated to identify them as an extension fields.

In some implementations, the architectures described herein provide an extension service. An extension service B references via the gateway BEP service registration an existing service A to extend it. Such an extension service does exactly what its name implies. It extends the existing service A. I.e. the OData service for service A contain all the EDM artefacts defined in service A plus all the EDM artefacts defined in service B. The OData service URL itself of service A does not change.

An extension service includes its own model provider. An extension service can define its own EDM artefacts like e.g., entity types, sets and function imports. An extension service can define navigation properties pointing from entity types of service B to entity types of service A. An extension service can also define navigation properties pointing from entity types of service A to entity types of service B. Other than that it cannot modify any other EDM artefact of service A. An extension service has its own data provider. An extension service provides the data for all entity sets etc. that have been defined via model provider B. An extension service provides the data for the navigation properties pointing from service B to service A via the methods READ_REF_TARGET_KEY_DATA and READ_REF_TARGET_KEY_DATA_LIST. An extension service also provides the data for the navigation properties pointing from service A to service B via the methods READ_REF_TARGET_KEY_DATA and READ_REF_TARGET_KEY_DATA_LIST. An extension service cannot be published.

In some implementations, EDM artefacts can be modified, but the extension service cannot modify any EDM artefact of service A other than adding navigation properties (and the corresponding navigation property bindings and referential constraints). If a service only implements the ADVANCED interfaces it cannot be extended. Of course a service can implement any /IWBEP/IF_V4_DP_ADVANCED method. As long as it also implements all methods in the /IWBEP/IF_V4_DP_BASIC interface it will be extendable. For many requests data is to be collected from both services A and B. Examples can be GET request with $expand or requests with navigation or BATCH requests. And the generic coding collecting the data from both services is the generic implementation in class /IWBEP/CL_V4_ABS_DATA_ PROVIDER of the interfaces /IWBEP/IF_V4_DP_ADVANCED and /IWBEP/IF_V4_DP_INTERMEDIATE.

Figure 8:
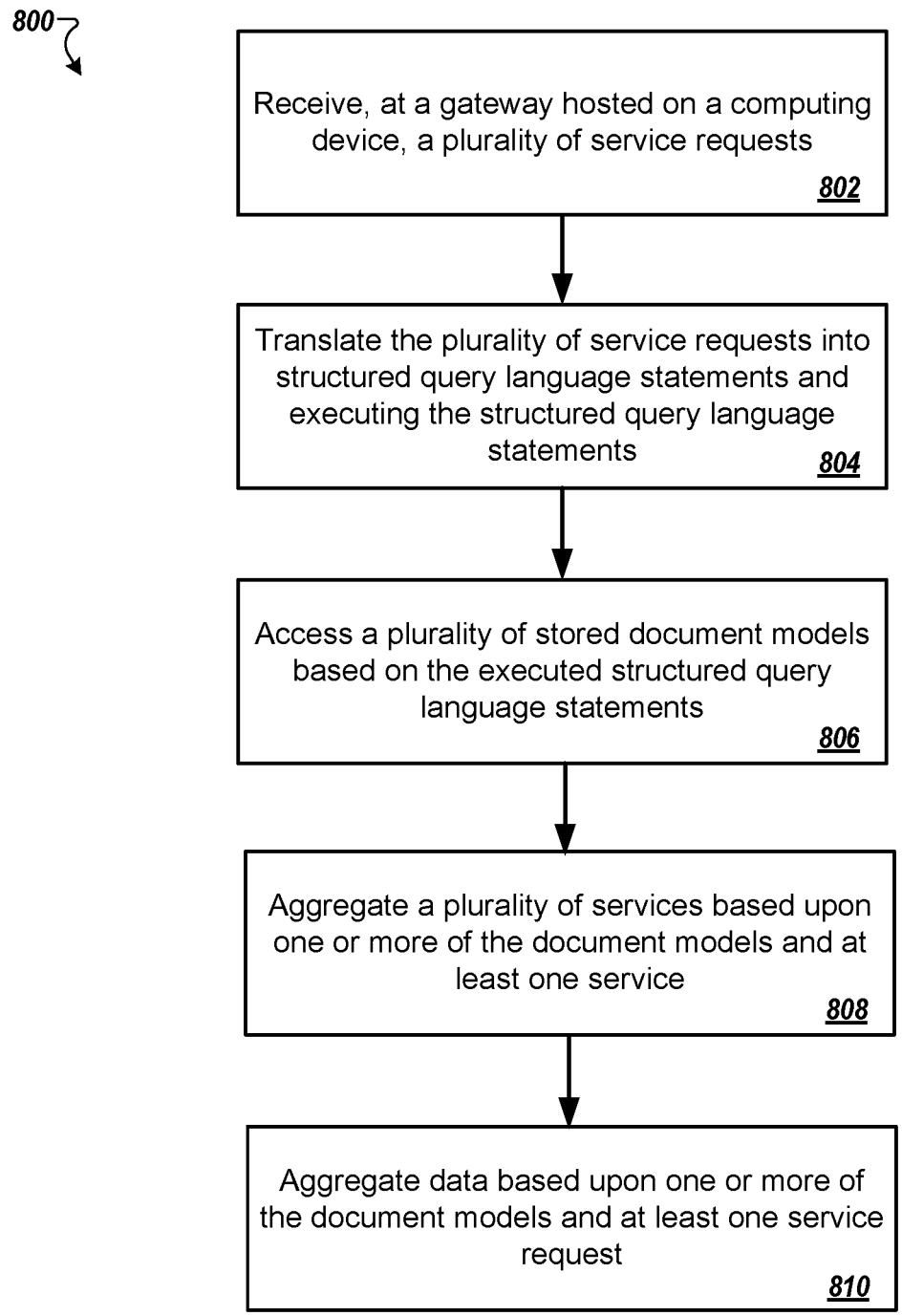
FIG. 8 is a flowchart that illustrates a method of generating user interfaces at runtime.

FIG. 8 is a flowchart that illustrates a method 800 of generating user interfaces at runtime. The method 800 can enable applications to be executed in a scalable manner and cost-efficient manner in a cloud environment, which can be accomplished by the OData protocol that follows many of the principles of the REST paradigm, as described in detail above. For example, services may be open protocol data services (OData services) that access data models and corresponding metadata to provide a proxy to access at least one of the plurality of user interfaces. In some implementations, the gateway employs RESTful application programming interfaces to provide at least one service. In some implementations, the gateway represents an access layer between a client device and at least one user interface in the plurality of user interfaces. In some implementations, the gateway enables the development of additional user interfaces based upon the document models.

The method 800 may include, at block 802 receiving, at a gateway hosted on a computing device, a plurality of service requests. For example, the gateway 408 may receive read and write requests (e.g., accesses) generated by users accessing enterprise software executing in a cloud environment. The gateway 408 may map read requests (e.g., accesses) to the SADL runtime and write requests (e.g., accesses) to BOPF service calls.

At block 804, the method 800 may include translating the plurality of service requests into structured query language statements. The method 800 may also include executing the structured query language statements. For example, the SADL 306 may translate read requests to corresponding SQL statements and execute the statements via the ABAP Query Interface on the persistence of CDS views. The BOPF contains the business logic to eventually update application table entries. In some implementations, execution of the structured query language statements is based at least in part on the plurality of predefined document models.

At block 806, the method 800 may include accessing a plurality of stored document models based on the executed structured query language statements. For example, the CDS 410 is an example approach for data modeling by S/4 HANA, and OData is an example approach for exposing these models for UI consumption. The OData services 406 may be created dynamically from given CDS views without the need to implement a service provider manually. The selected design times and implementation methods are included in a CDS model editor offering a 1:1 CDS OData Exposure yielding a dedicated service for a selected view, and the Gateway Service Builder supporting referenced data sources that allow including multiple CDS views in one OData service.

At block 808, the method 800 may include aggregating a plurality of services based upon one or more of the document models and at least one service. For example, the OData protocol 406 can be used to automatically aggregate a number of dimensions and measures to according to predefined document models and data identified in one or more available service.

At block 810, the method 800 may include generating and providing a plurality of user interfaces configured to present the aggregated data. The aggregated data may be presented in a user interface and/or be presented as at least one service. For example, the gateway can be used to generate and provide user interfaces generated, at runtime, for a user in response to receiving a request to view particular data content.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A system for generating user interfaces at runtime, the system comprising:
   at least one memory including instructions on a computing device; and
   at least one processor on the computing device, wherein the processor is operably coupled to the at least one memory and is arranged and configured to execute the instructions that, when executed, cause the processor to implement:
      a gateway to receive a plurality of service requests, including read requests and write requests, wherein the gateway is configured to analyze the plurality of service requests to dynamically select, at runtime, an execution runtime, from a plurality of execution runtimes, to process a respective request, wherein the plurality of execution runtimes include a read-only model-driven runtime, an object processing runtime, and an analytical engine, wherein the analyzing includes:
         selecting the read-only model-driven runtime based on determining that the respective request is a read request;
         selecting the object-processing runtime based on determining that the respective request is a write request;
         selecting the analytical engine based on determining that the request includes analytical annotations that require processing by the analytical engine; and
         selecting the read-only model-driven runtime based on determining that the request includes analytical annotations that do not require processing by the analytical engine;
      a first component to translate the plurality of service requests into structured query language statements and execute the structured query language statements;
      a second component to access a plurality of stored document models based on the executed structured query language statements;
      a service component to aggregate data based upon one or more of the document models and at least one service; and
      a user interface generator to generate and provide a plurality of user interfaces configured to present the aggregated data.

2. The system of claim 1, wherein functionality of the at least one service is generated automatically for provision in the plurality of user interfaces.

3. The system of claim 1, wherein the execution of the structured query language statements is based at least in part on the plurality of stored document models.

4. The system of claim 1, wherein the gateway represents an access layer between a client device and at least one user interface in the plurality of user interfaces.

5. The system of claim 1, wherein the gateway enables development of additional user interfaces based upon the document models.

6. The system of claim 1, wherein the gateway employs Representational State Transfer (RESTful) application programming interfaces (APIs) to provide the plurality of user interfaces.

7. The system of claim 1, wherein the plurality of services are open protocol data services that access the data models and corresponding metadata to provide a proxy to access at least one of the plurality of user interfaces.

8. The system of claim 7, wherein the open protocol data services define a communication protocol for accessing the at least one user interface.

9. The system of claim 1, wherein the gateway supports a plurality of different versions for the at least one service.

10. A computer-implemented method for generating user interfaces at runtime, the method comprising:
   receiving, at a gateway hosted on a computing device, a plurality of service requests including read requests and write requests;
   analyzing the plurality of service requests to dynamically select, at runtime, an execution runtime, from a plurality of execution runtimes, to process a respective request, the plurality of execution runtimes including a read-only model-driven runtime, an object processing runtime, and an analytical engine, including:
      selecting the read-only model-driven runtime based on determining that the respective request is a read request;
      selecting the object-processing runtime based on determining that the respective request is a write request;
      selecting the analytical engine based on determining that the request includes analytical annotations that require processing by the analytical engine; and
      selecting the read-only model-driven runtime based on determining that the request includes analytical annotations that do not require processing by the analytical engine;
   translating the plurality of service requests into structured query language statements; and executing the structured query language statements;
accessing a plurality of stored document models based on the executed structured query language statements;
aggregating aggregate data based upon one or more of the document models and at least one service request; and
generating and providing a plurality of user interfaces configured to present the aggregated data.

11. The method of claim 10, wherein the execution of the structured query language statements is based at least in part on the plurality of stored document models.

12. The method of claim 10, wherein the gateway represents an access layer between a client device and at least one user interface in the plurality of user interfaces.

13. The method of claim 10, wherein the gateway enables development of additional user interfaces based upon the document models.

14. The method of claim 10, wherein the gateway employs Representational State Transfer (RESTful) application programming interfaces (APIs) to provide the at least one service.

15. The method of claim 10, wherein the at least one service is an open protocol data service that accesses the data models and corresponding metadata to provide a proxy to access at least one of the plurality of user interfaces.

16. A computer program product being tangibly embodied on a non-transitory computer-readable storage medium and comprising instructions that, when executed by at least one computing device, are configured to cause the at least one computing device to:
receive, at a gateway hosted on a computing device, a plurality of service requests including read requests and write requests;
analyze the plurality of service requests to dynamically select, at runtime, an execution runtime, from a plurality of execution runtimes, to process a respective request, the plurality of execution runtimes including a read-only model-driven runtime, an object processing runtime, and an analytical engine, including:
    selecting the read-only model-driven runtime based on determining that the respective request is a read request;
    selecting the object-processing runtime based on determining that the respective request is a write request;
    selecting the analytical engine based on determining that the request includes analytical annotations that require processing by the analytical engine; and
    selecting the read-only model-driven runtime based on determining that the request includes analytical annotations that do not require processing by the analytical engine;
translate the plurality of service requests into structured query language statements and executing the structured query language statements;
access a plurality of stored document models based on the executed structured query language statements;
aggregate data based upon one or more of the document models and at least one service request; and
generate and providing a plurality of user interfaces configured to present the aggregated data.

17. The computer program product of claim 16, wherein the execution of the structured query language statements is based at least in part on the plurality of stored document models.

18. The computer program product of claim 16, wherein the gateway represents an access layer between a client device and at least one user interface in the plurality of user interfaces.

19. The computer program product of claim 16, wherein the gateway enables development of additional user interfaces based upon the document models.

20. The computer program product of claim 16, wherein the at least one service is an open protocol data service that accesses the data models and corresponding metadata to provide a proxy to access at least one of the plurality of user interfaces.

* * * * *